US012614344B2

(12) United States Patent
Tian et al.

(10) Patent No.: US 12,614,344 B2
(45) Date of Patent: Apr. 28, 2026

(54) CHECKING OVERLAPPING-FREE PROPERTY FOR PATCHES IN MESH COMPRESSION

(71) Applicant: Tencent America LLC, Palo Alto, CA (US)

(72) Inventors: Jun Tian, Belle Mead, NJ (US); Shan Liu, San Jose, CA (US); Xiaozhong Xu, State College, PA (US); Xiang Zhang, Sunnyvale, CA (US); Chao Huang, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 258 days.

(21) Appl. No.: 17/969,580

(22) Filed: Oct. 19, 2022

(65) Prior Publication Data

US 2023/0196663 A1 Jun. 22, 2023

Related U.S. Application Data

(60) Provisional application No. 63/291,842, filed on Dec. 20, 2021.

(51) Int. Cl.
*G06T 15/50* (2011.01)
*G06T 15/04* (2011.01)
(52) U.S. Cl.
CPC ............ *G06T 15/506* (2013.01); *G06T 15/04* (2013.01)
(58) Field of Classification Search
None
See application file for complete search history.

(56) References Cited

U.S. PATENT DOCUMENTS

| | | | | |
|---|---|---|---|---|
| 6,147,695 | A * | 11/2000 | Bowen | G06T 17/00 |
| | | | | 345/503 |
| 8,872,824 | B1 * | 10/2014 | Phillips | G06T 15/60 |
| | | | | 345/426 |
| 2018/0253886 | A1 * | 9/2018 | Hu | G06T 11/001 |

(Continued)

FOREIGN PATENT DOCUMENTS

| | | |
|---|---|---|
| WO | 2020089592 A1 | 5/2020 |
| WO | 2021/136876 A1 | 7/2021 |

OTHER PUBLICATIONS

International Search Report and Written Opinion in PCT/US2022/078724, mailed Apr. 6, 2023, 10 pages.

(Continued)

*Primary Examiner* — Kyle Zhai
(74) *Attorney, Agent, or Firm* — ArentFox Schiff LLP

(57) ABSTRACT

Processing circuitry receive first UV coordinates associated with first vertices of a first patch and second UV coordinates associated with second vertices of a second patch. The first patch and the second patch are partitions from a three dimensional (3D) mesh, the 3D mesh represents a surface of an object with polygons and is partitioned into patches. The first patch includes the first vertices that are mapped to first two dimensional (2D) vertices of a first 2D patch in a 2D map according to the first UV coordinates, the second patch includes the second vertices that are mapped to second 2D vertices of a second 2D patch in the 2D map according to the second UV coordinates. The processing circuitry can apply various overlapping checking techniques on the first 2D patch and the second 2D patch.

9 Claims, 17 Drawing Sheets

(56) References Cited

U.S. PATENT DOCUMENTS

| | | | |
|---|---|---|---|
| 2019/0347854 A1* | 11/2019 | Karlov | G06T 15/04 |
| 2020/0159401 A1* | 5/2020 | Shao | G06F 3/04847 |
| 2020/0314435 A1 | 10/2020 | Tourapis et al. | |
| 2021/0019936 A1 | 1/2021 | Oyman | |
| 2021/0217203 A1* | 7/2021 | Kim | G06T 9/001 |
| 2021/0272323 A1* | 9/2021 | Ricard | H04N 19/597 |

OTHER PUBLICATIONS

Smith et al. "Bijective Parameterization with Free Boundaries." In: ACM Transactions on Graphics, vol. 34, Issue 4; 27, Jul. 2015, [online] [retrieved on Nov. 14, 2020] Retrieved from the Internet< URL: https://dl.acm.org/doi/10.1145/2766947>, entire document.
Draft CfP for Dynamic Mesh Coding, International Organization for Standardization Organisation Internationale De Normalisation, ISO/IEC JTC 1/SC 29/WG 7, MPEG 3D Graphics Coding, N 00122, Apr. 2021, Virtual, Serial No. MDS20403, pp. 1-21.
Office Action received for Japanese Patent Application No. 2023-566744, mailed on Aug. 20, 2024, 10 pages (6 pages of English Translation and 4 pages of Original Document).
Extended European Search Report received for European Application No. 22912553.9, mailed on Apr. 11, 2025, 10 pages.

* cited by examiner

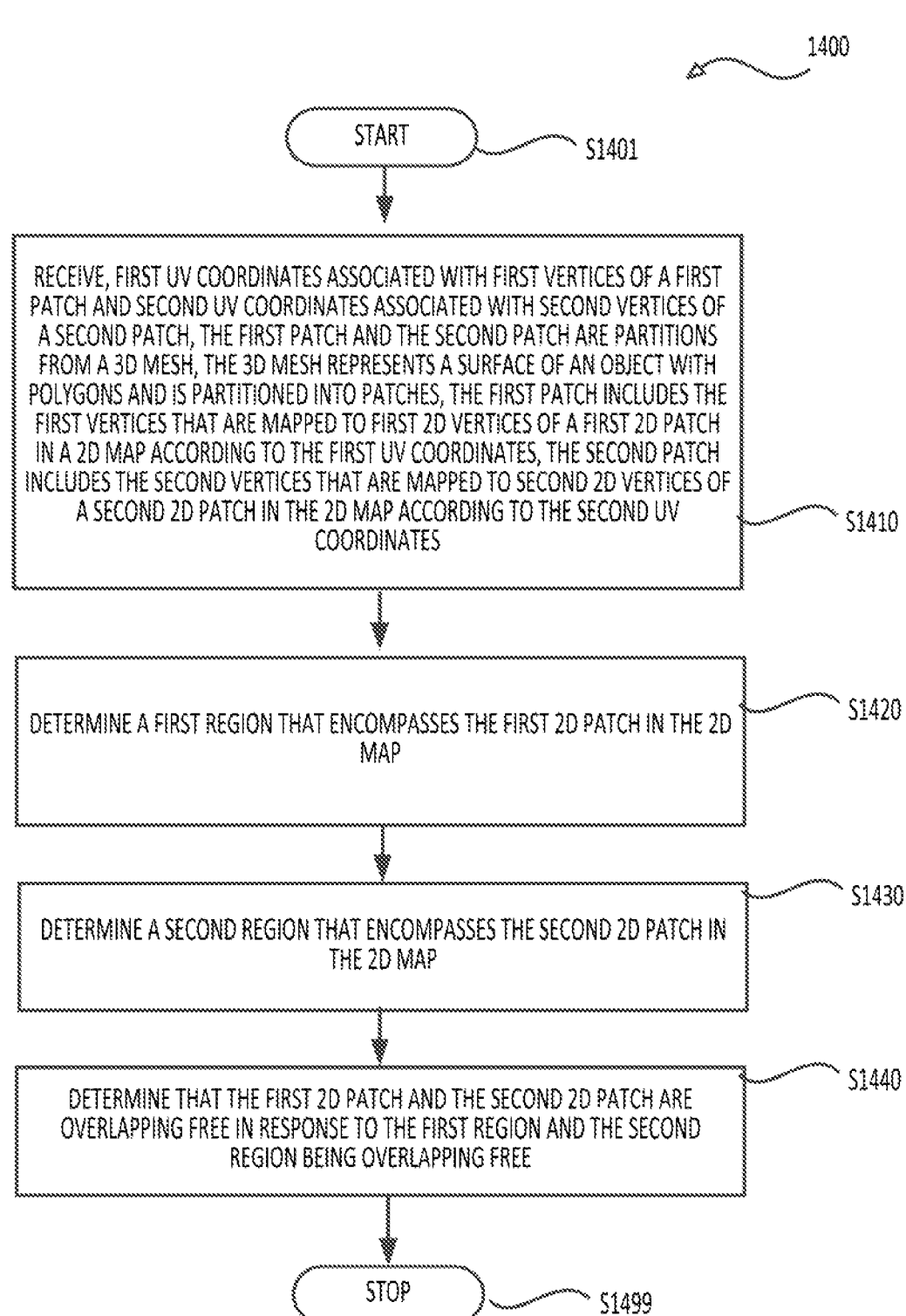

1400

START — S1401

RECEIVE, FIRST UV COORDINATES ASSOCIATED WITH FIRST VERTICES OF A FIRST PATCH AND SECOND UV COORDINATES ASSOCIATED WITH SECOND VERTICES OF A SECOND PATCH, THE FIRST PATCH AND THE SECOND PATCH ARE PARTITIONS FROM A 3D MESH, THE 3D MESH REPRESENTS A SURFACE OF AN OBJECT WITH POLYGONS AND IS PARTITIONED INTO PATCHES, THE FIRST PATCH INCLUDES THE FIRST VERTICES THAT ARE MAPPED TO FIRST 2D VERTICES OF A FIRST 2D PATCH IN A 2D MAP ACCORDING TO THE FIRST UV COORDINATES, THE SECOND PATCH INCLUDES THE SECOND VERTICES THAT ARE MAPPED TO SECOND 2D VERTICES OF A SECOND 2D PATCH IN THE 2D MAP ACCORDING TO THE SECOND UV COORDINATES — S1410

DETERMINE A FIRST REGION THAT ENCOMPASSES THE FIRST 2D PATCH IN THE 2D MAP — S1420

DETERMINE A SECOND REGION THAT ENCOMPASSES THE SECOND 2D PATCH IN THE 2D MAP — S1430

DETERMINE THAT THE FIRST 2D PATCH AND THE SECOND 2D PATCH ARE OVERLAPPING FREE IN RESPONSE TO THE FIRST REGION AND THE SECOND REGION BEING OVERLAPPING FREE — S1440

STOP — S1499

*FIG. 14*

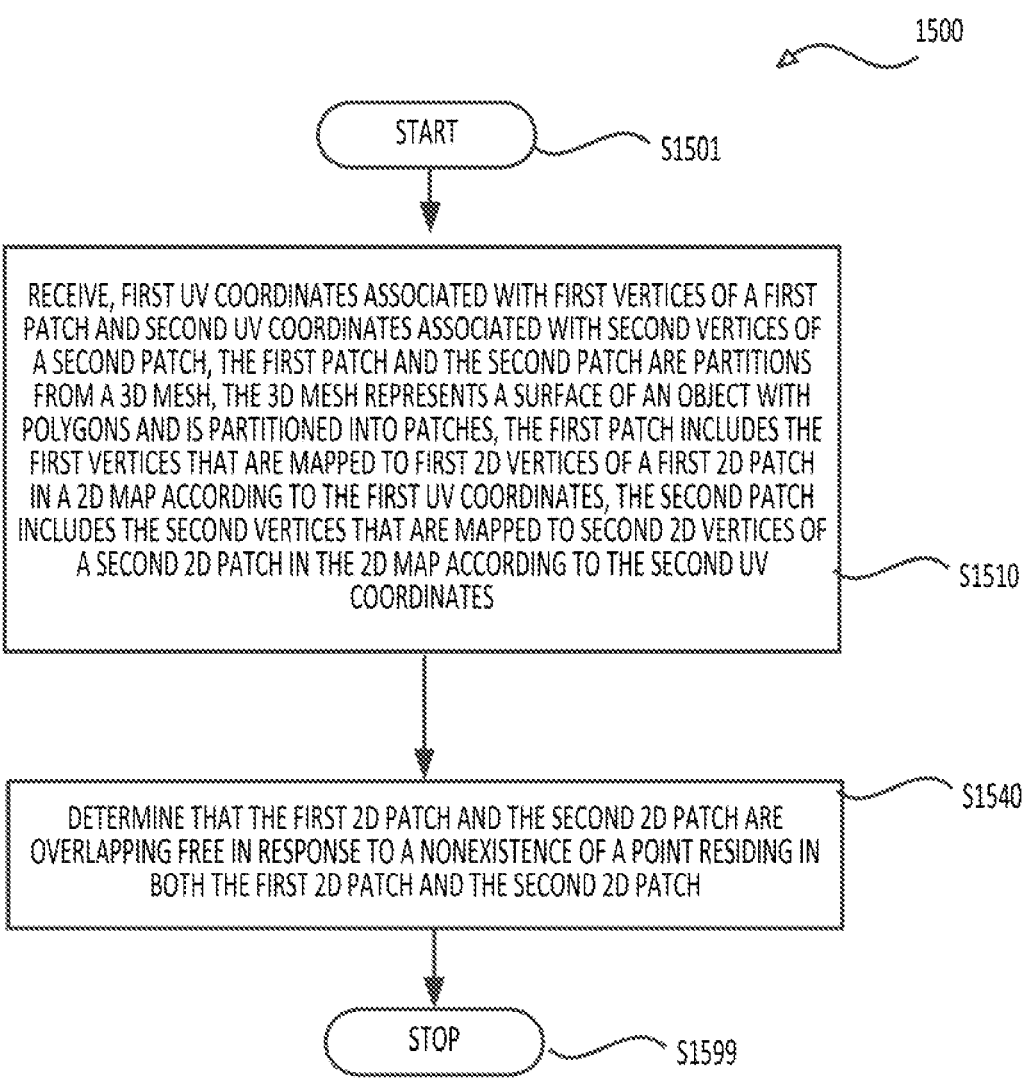

1500

START S1501

RECEIVE, FIRST UV COORDINATES ASSOCIATED WITH FIRST VERTICES OF A FIRST PATCH AND SECOND UV COORDINATES ASSOCIATED WITH SECOND VERTICES OF A SECOND PATCH, THE FIRST PATCH AND THE SECOND PATCH ARE PARTITIONS FROM A 3D MESH, THE 3D MESH REPRESENTS A SURFACE OF AN OBJECT WITH POLYGONS AND IS PARTITIONED INTO PATCHES, THE FIRST PATCH INCLUDES THE FIRST VERTICES THAT ARE MAPPED TO FIRST 2D VERTICES OF A FIRST 2D PATCH IN A 2D MAP ACCORDING TO THE FIRST UV COORDINATES, THE SECOND PATCH INCLUDES THE SECOND VERTICES THAT ARE MAPPED TO SECOND 2D VERTICES OF A SECOND 2D PATCH IN THE 2D MAP ACCORDING TO THE SECOND UV COORDINATES S1510

DETERMINE THAT THE FIRST 2D PATCH AND THE SECOND 2D PATCH ARE OVERLAPPING FREE IN RESPONSE TO A NONEXISTENCE OF A POINT RESIDING IN BOTH THE FIRST 2D PATCH AND THE SECOND 2D PATCH S1540

STOP S1599

FIG. 15

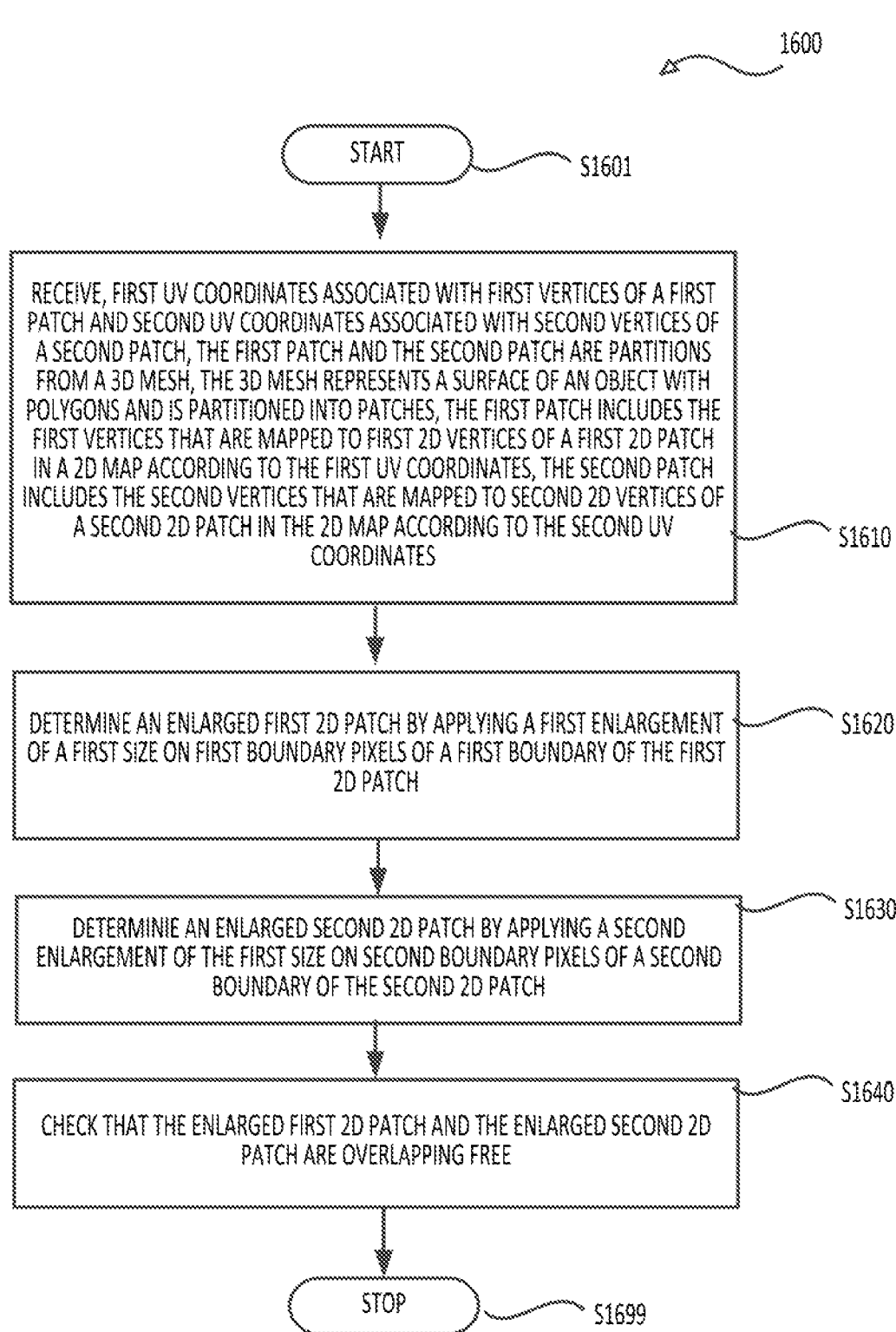

1600

START — S1601

RECEIVE, FIRST UV COORDINATES ASSOCIATED WITH FIRST VERTICES OF A FIRST PATCH AND SECOND UV COORDINATES ASSOCIATED WITH SECOND VERTICES OF A SECOND PATCH, THE FIRST PATCH AND THE SECOND PATCH ARE PARTITIONS FROM A 3D MESH, THE 3D MESH REPRESENTS A SURFACE OF AN OBJECT WITH POLYGONS AND IS PARTITIONED INTO PATCHES, THE FIRST PATCH INCLUDES THE FIRST VERTICES THAT ARE MAPPED TO FIRST 2D VERTICES OF A FIRST 2D PATCH IN A 2D MAP ACCORDING TO THE FIRST UV COORDINATES, THE SECOND PATCH INCLUDES THE SECOND VERTICES THAT ARE MAPPED TO SECOND 2D VERTICES OF A SECOND 2D PATCH IN THE 2D MAP ACCORDING TO THE SECOND UV COORDINATES — S1610

DETERMINE AN ENLARGED FIRST 2D PATCH BY APPLYING A FIRST ENLARGEMENT OF A FIRST SIZE ON FIRST BOUNDARY PIXELS OF A FIRST BOUNDARY OF THE FIRST 2D PATCH — S1620

DETERMINIE AN ENLARGED SECOND 2D PATCH BY APPLYING A SECOND ENLARGEMENT OF THE FIRST SIZE ON SECOND BOUNDARY PIXELS OF A SECOND BOUNDARY OF THE SECOND 2D PATCH — S1630

CHECK THAT THE ENLARGED FIRST 2D PATCH AND THE ENLARGED SECOND 2D PATCH ARE OVERLAPPING FREE — S1640

STOP — S1699

FIG. 16

CHECKING OVERLAPPING-FREE PROPERTY FOR PATCHES IN MESH COMPRESSION

INCORPORATION BY REFERENCE

This present application claims the benefit of priority to U.S. Provisional Application No. 63/291,842, "Checking Overlapping-free Property for Patches in Mesh Compression" filed on Dec. 20, 2021. The entire disclosure of the prior application is hereby incorporated by reference in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry receive first UV coordinates associated with first vertices of a first patch and second UV coordinates associated with second vertices of a second patch. The first patch and the second patch are partitions from a three dimensional (3D) mesh, the 3D mesh represents a surface of an object with polygons and is partitioned into patches. The first patch includes the first vertices that are mapped to first two dimensional (2D) vertices of a first 2D patch in a 2D map according to the first UV coordinates, the second patch includes the second vertices that are mapped to second 2D vertices of a second 2D patch in the 2D map according to the second UV coordinates. In some embodiments, the processing circuitry determines a first region that encompasses the first 2D patch in the 2D map and determines a second region that encompasses the second 2D patch in the 2D map. The processing circuitry determines that the first region and the second region are overlapping free. The processing circuitry determines that the first 2D patch and the second 2D patch are overlapping free in response to the first region and the second region being overlapping free.

In an embodiment, the first region is a first bounding box of the first 2D patch, and the second region is a second bounding box of the second 2D patch. In some examples, the processing circuitry determines the first bounding box according to a minimum U coordinate value, a maximum U coordinate value, a minimum V coordinate value, a minimum V coordinate value and a maximum V coordinate value in the first UV coordinates, and determines the second bounding box according to a minimum U coordinate value, a maximum U coordinate value, a minimum V coordinate value and a maximum V coordinate value in the second UV coordinates.

In another embodiment, the first region is an enlarged first bounding box of an enlarged first 2D patch for the first 2D patch, and the second region is an enlarged second bounding box of an enlarged second 2D patch for the second 2D patch. In some examples, the processing circuitry determines a first bounding box according to a minimum U coordinate value, a maximum U coordinate value, a minimum V coordinate value and a maximum V coordinate value in the first UV coordinates, and determines a second bounding box according to a minimum U coordinate value, a maximum U coordinate value, a minimum V coordinate value and a maximum V coordinate value in the second UV coordinates. The processing circuitry determines the enlarged first bounding box by enlarging a boundary of the first bounding box, and determines the enlarged second bounding box by enlarging a boundary of the second bounding box.

In some embodiments, the processing circuitry determines that the first 2D patch and the second 2D patch are overlapping free in response to a nonexistence of a point residing in both the first 2D patch and the second 2D patch. In an embodiment, the processing circuitry checks whether respective first points at integer pixel positions in the first 2D patch reside in the second 2D patch, and checks whether the respective first points in the first 2D patch are on a boundary of the second 2D patch.

In another embodiment, the processing circuitry checks whether respective first boundary vertices in the first 2D vertices reside in the second 2D patch, and checks whether respective second boundary vertices in the second 2D vertices reside in the first 2D patch. The processing circuitry also checks whether the respective first boundary vertices in the first 2D vertices are on a boundary of the second 2D patch, and checks whether the respective second boundary vertices in the second 2D vertices are on a boundary of the first 2D patch.

In some embodiments, to determine the first 2D patch and the second 2D patch are overlapping free, the processing circuitry determines that a first boundary of the first 2D patch and a second boundary of the second 2D patch are intersection free, and determines that none of the first 2D patch and the second 2D patch resides inside another of the first 2D patch and the second 2D patch.

To check whether the first boundary and the second boundary are intersection free, in some examples, for a first line segment in the first boundary and a second line segment in the second boundary, the processing circuitry determines a first orientation of a first triangle formed by a first start point of the first line segment, a second start point of the second line segment, and a second end of the second line segment, and determines a second orientation of a second triangle formed by a first end point of the first line segment, the second start point of the second line segment, and the second end of the second line segment; and determining that the first boundary and the second boundary intersect in response to the first orientation being different from the second orientation.

In some examples, the processing circuitry determines that the first line segment and the second line segment intersect in response to at least one of the first start point and the first end point being on the second line segment, and determines that the first line segment and the second line segment intersect in response to at least one of the second start point and the second end point being on the first line segment.

In some examples, the processing circuitry determines a third orientation of a third triangle formed by the second start point of the second line segment, the first start point of the first line segment, and the first end of the first line segment, and determines a fourth orientation of a fourth triangle formed by the second end point of the second line segment, the first start point of the first line segment, and the first end of the first line segment. The processing circuitry determines that the first boundary and the second boundary intersect in response to the third orientation being different from the fourth orientation.

In some examples, to determine that none of the first 2D patch and the second 2D patch resides inside the other of the first 2D patch and the second 2D patch, the processing circuitry determines that a first point of the first 2D patch does not reside inside of the second 2D patch, and determines that a second point of the second 2D patch does not reside inside the first 2D patch.

In some embodiments, the processing circuitry determines an enlarged first 2D patch by applying a first enlargement of a first size on first boundary pixels of a first boundary of the first 2D patch, and determines an enlarged second 2D patch by applying a second enlargement of the first size on second boundary pixels of a second boundary of the second 2D patch. The processing circuitry can check whether the enlarged first 2D patch and the enlarged second 2D patch are overlapping free.

To check whether the enlarged first 2D patch and the enlarged second 2D patch are overlapping free, in some examples, the processing circuitry determines first double enlarged squares by applying a third enlargement of a second size on first boundary vertices in the first 2D vertices, the second size doubling the first size, and determines second double enlarged squares by applying a fourth enlargement of the second size on second boundary vertices in the second 2D vertices. The processing circuitry determines a first set of line segments that comprises first boundary edges in the first boundary, and first neighborhood boundary edges of the first double enlarged squares, and determines a second set of line segments that comprises second boundary edges of the second boundary, and second neighborhood boundary edges of the second double enlarged squares. Then, the processing circuitry can determine whether the first set of line segments and the second set of line segments are intersection free.

In some examples, the processing circuitry also checks whether the enlarged first 2D patch does not reside in the enlarged second 2D patch; and whether the enlarged second 2D patch does not reside in the enlarged first 2D patch.

In an example, to determine that the enlarged first 2D patch and the enlarged second 2D patch are overlapping free, the processing circuitry can check whether a first bounding box of the enlarged first 2D patch and a second bounding box of the enlarged second 2D patch are overlapping free. In another example, the processing circuitry can determine that the enlarged first 2D patch and the enlarged second 2D patch are overlapping free in response to a nonexistence of a point residing in both the enlarged first 2D patch and the enlarged second 2D patch.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which:

FIG. 14 shows a flow chart outlining a process example in some examples.

FIG. 15 shows a flow chart outlining a process example in some examples.

FIG. 16 shows a flow chart outlining a process example in some examples.

DETAILED DESCRIPTION OF EMBODIMENTS

Figure 1:
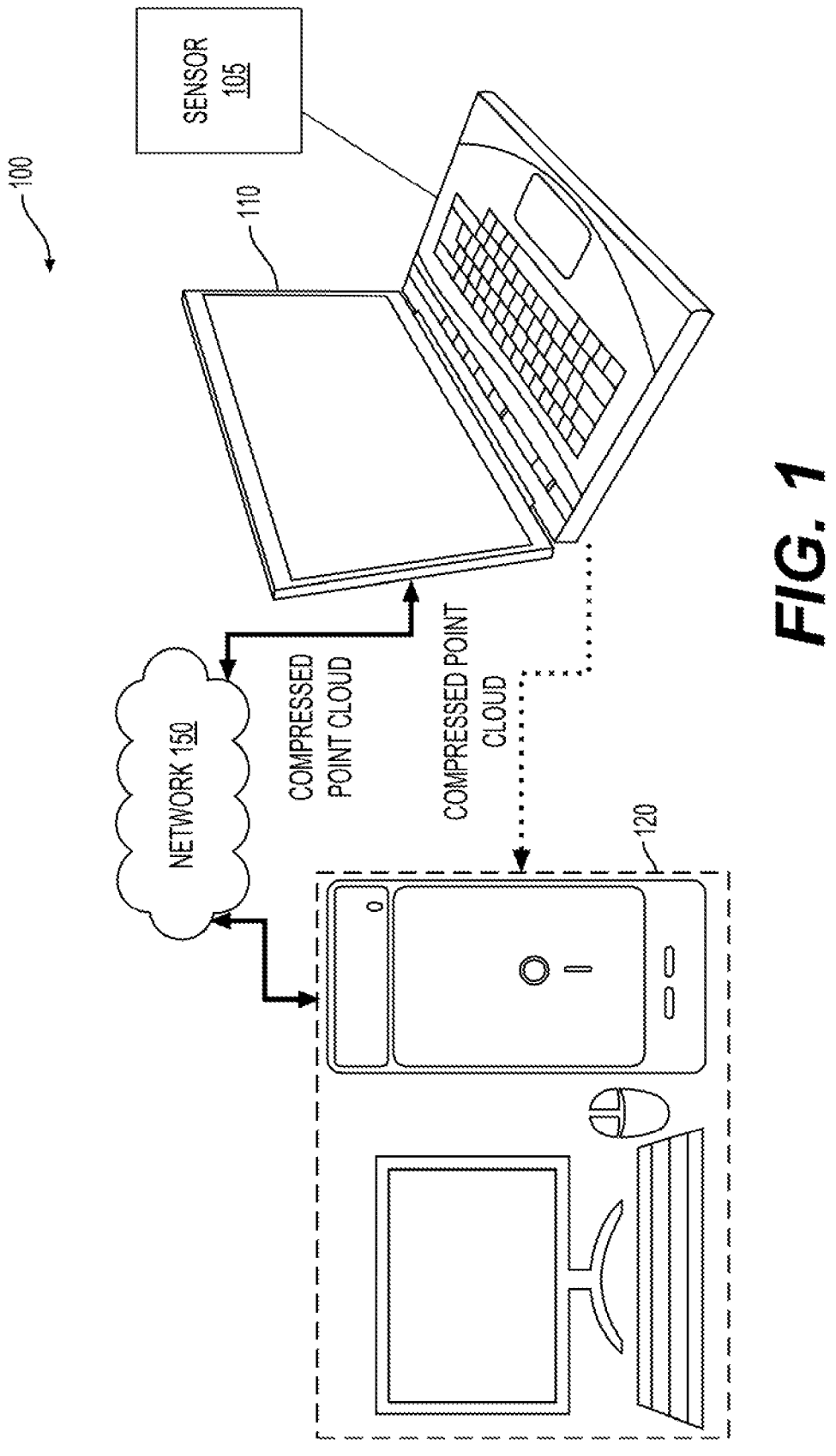
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
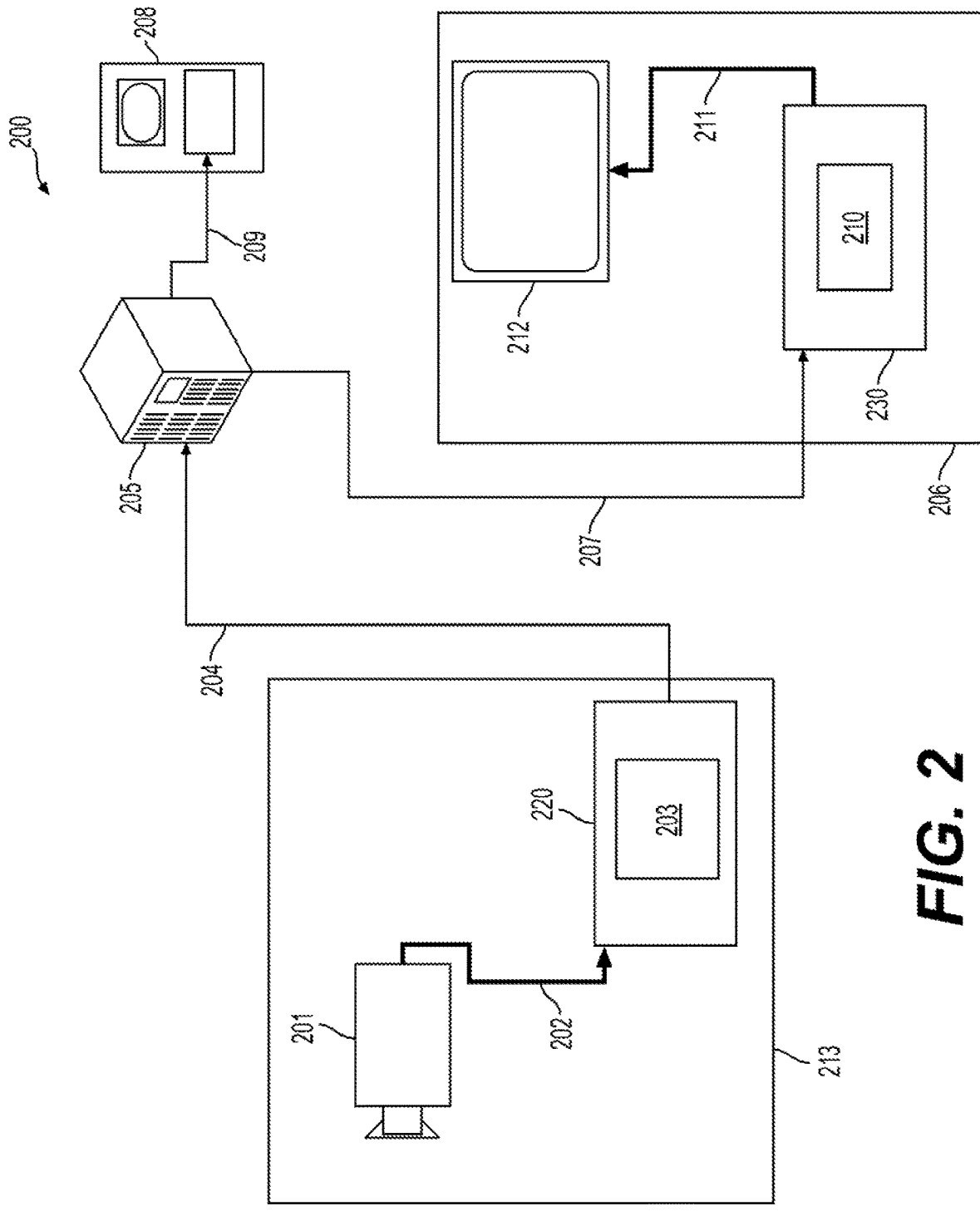
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
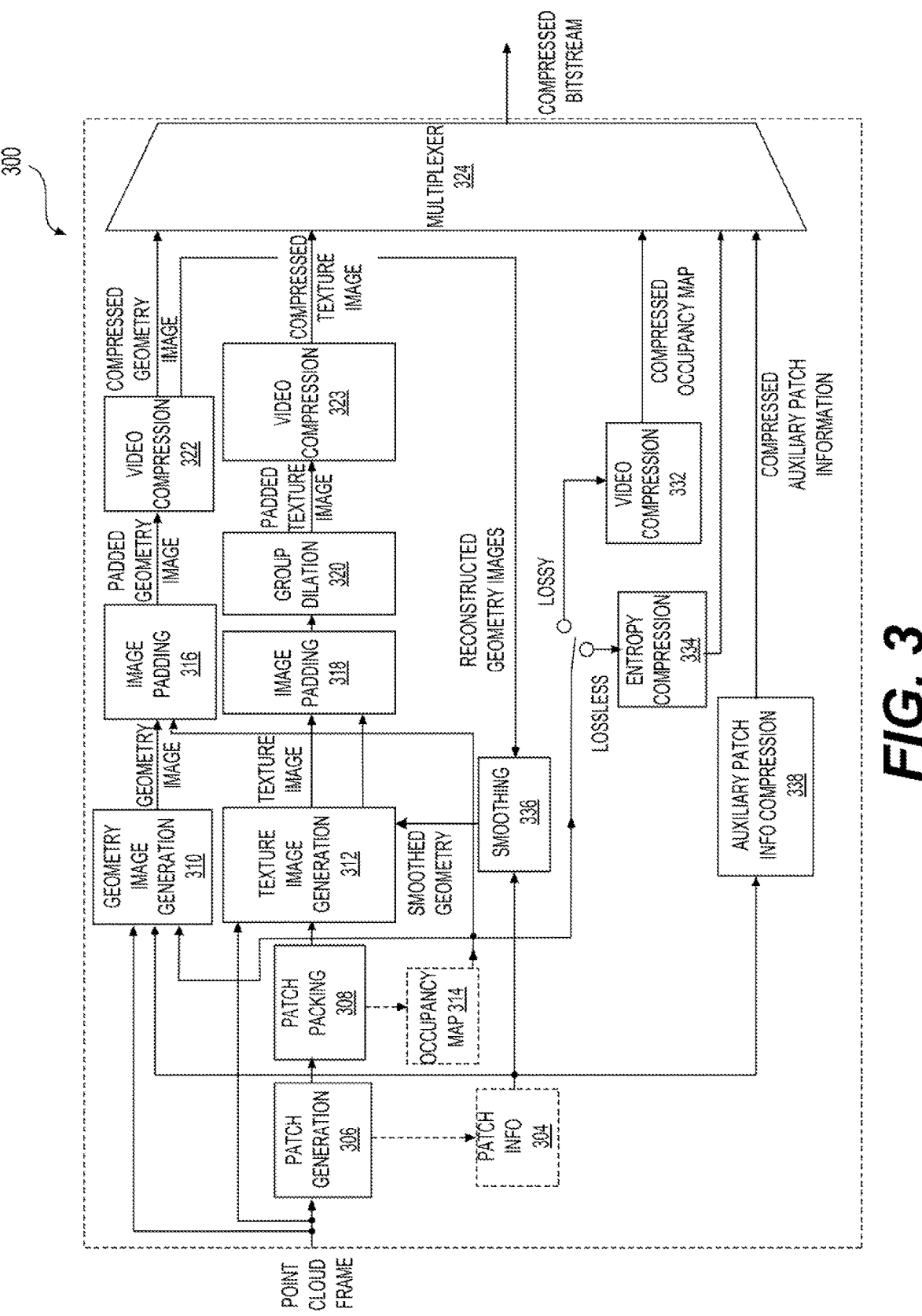
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
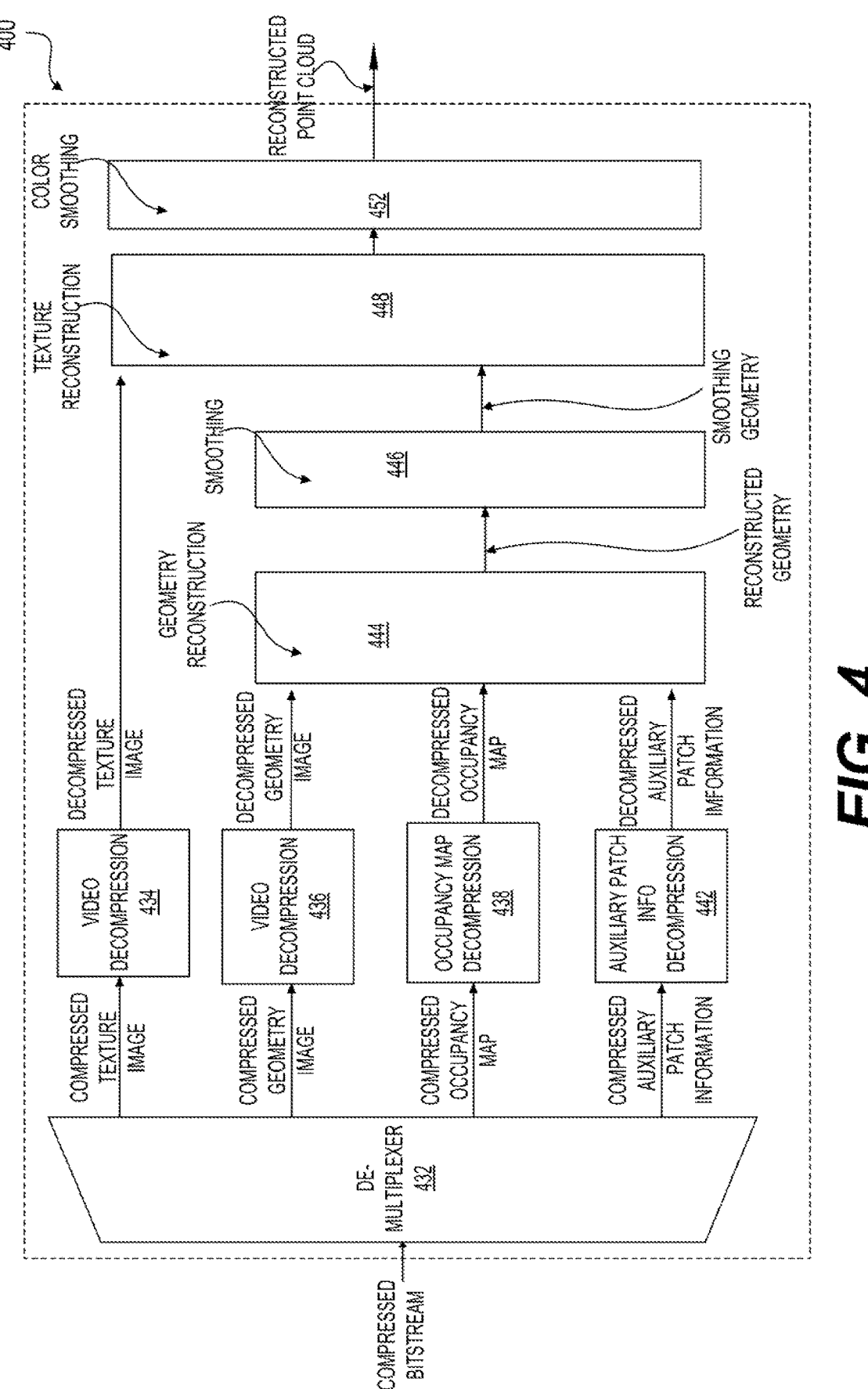
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
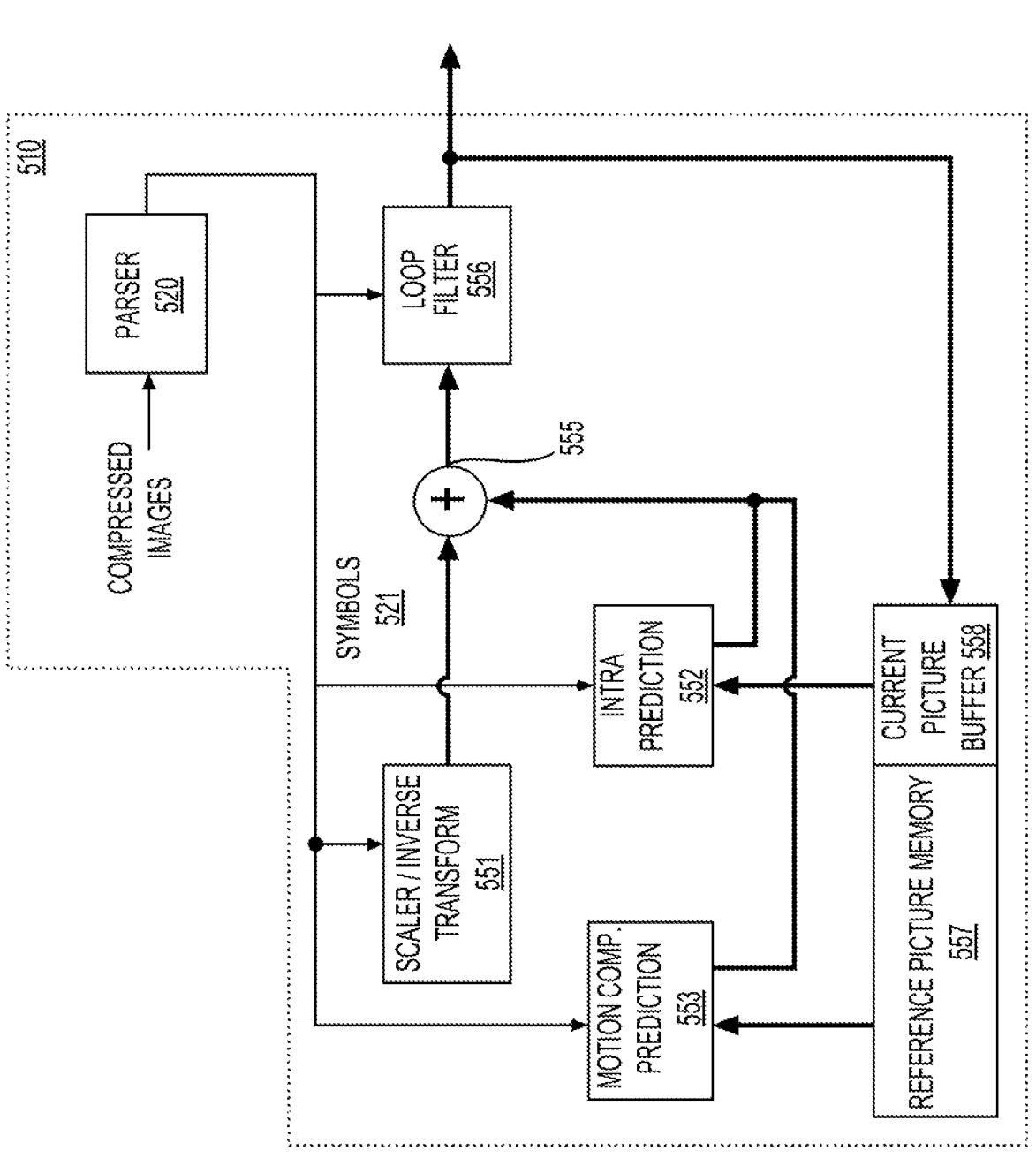
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
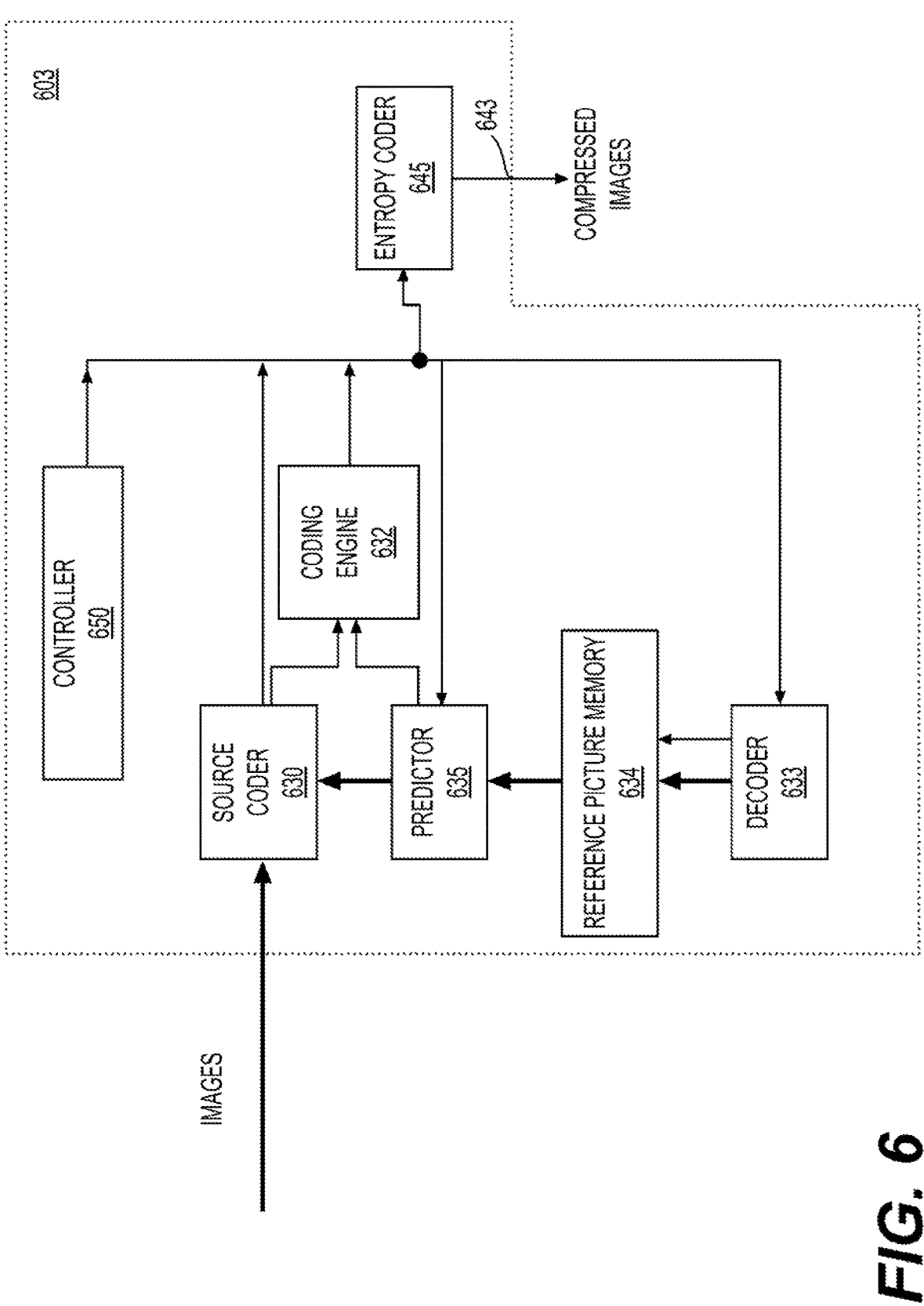
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
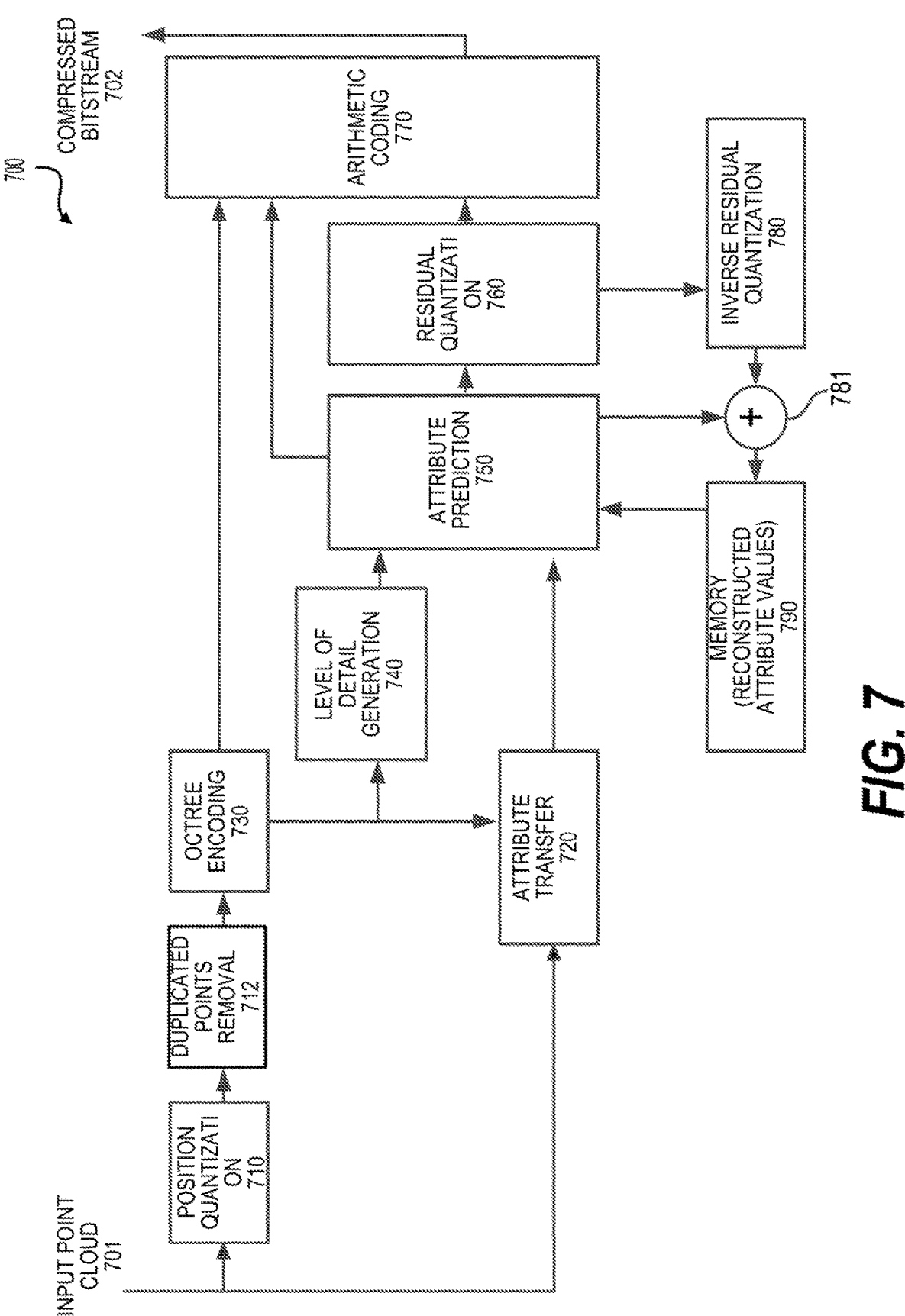
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
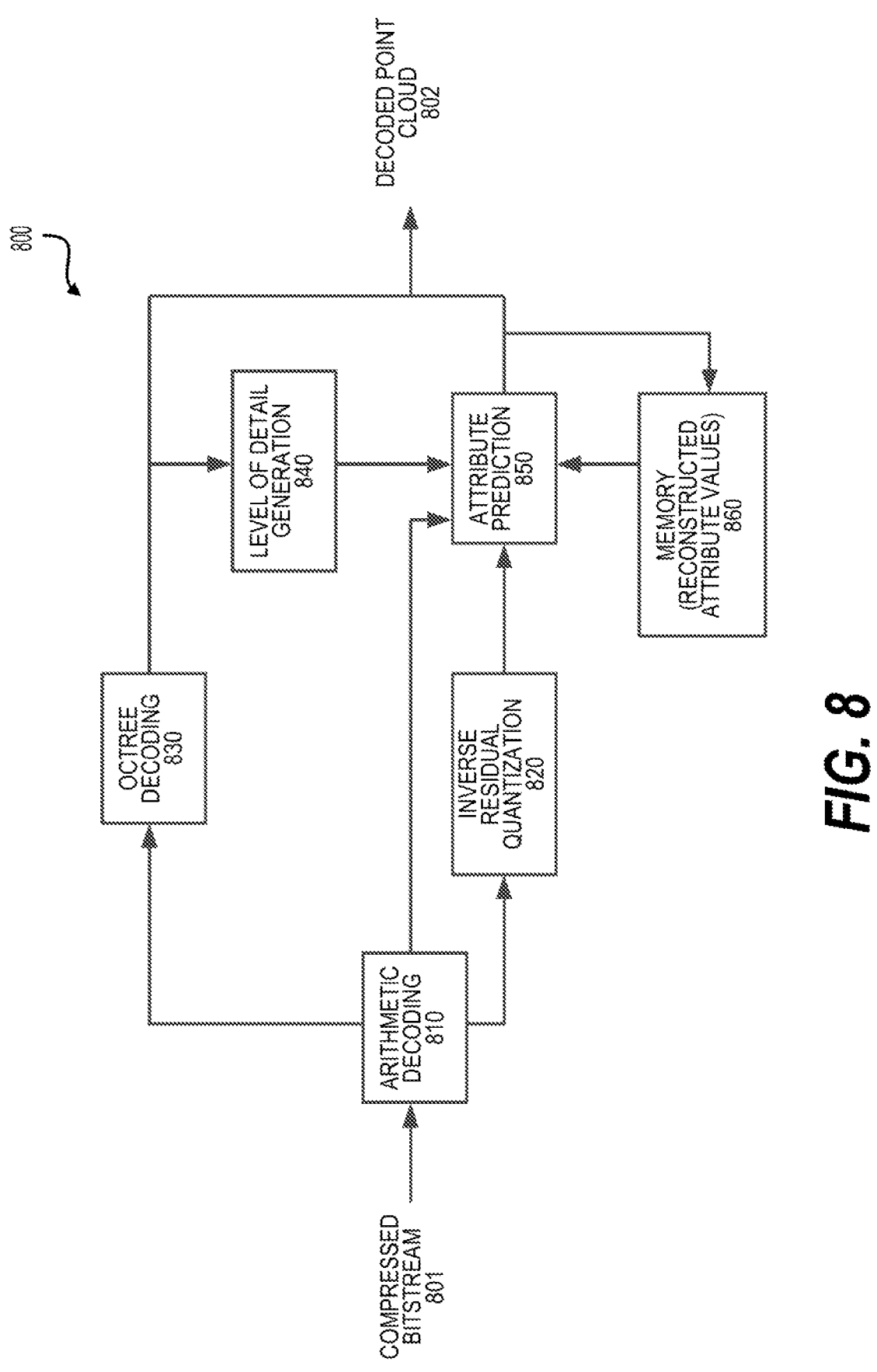
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

According to an aspect of the disclosure, the patches are parameterized respectively into 2D shapes (also referred to as 2D patches, UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

Figure 9:
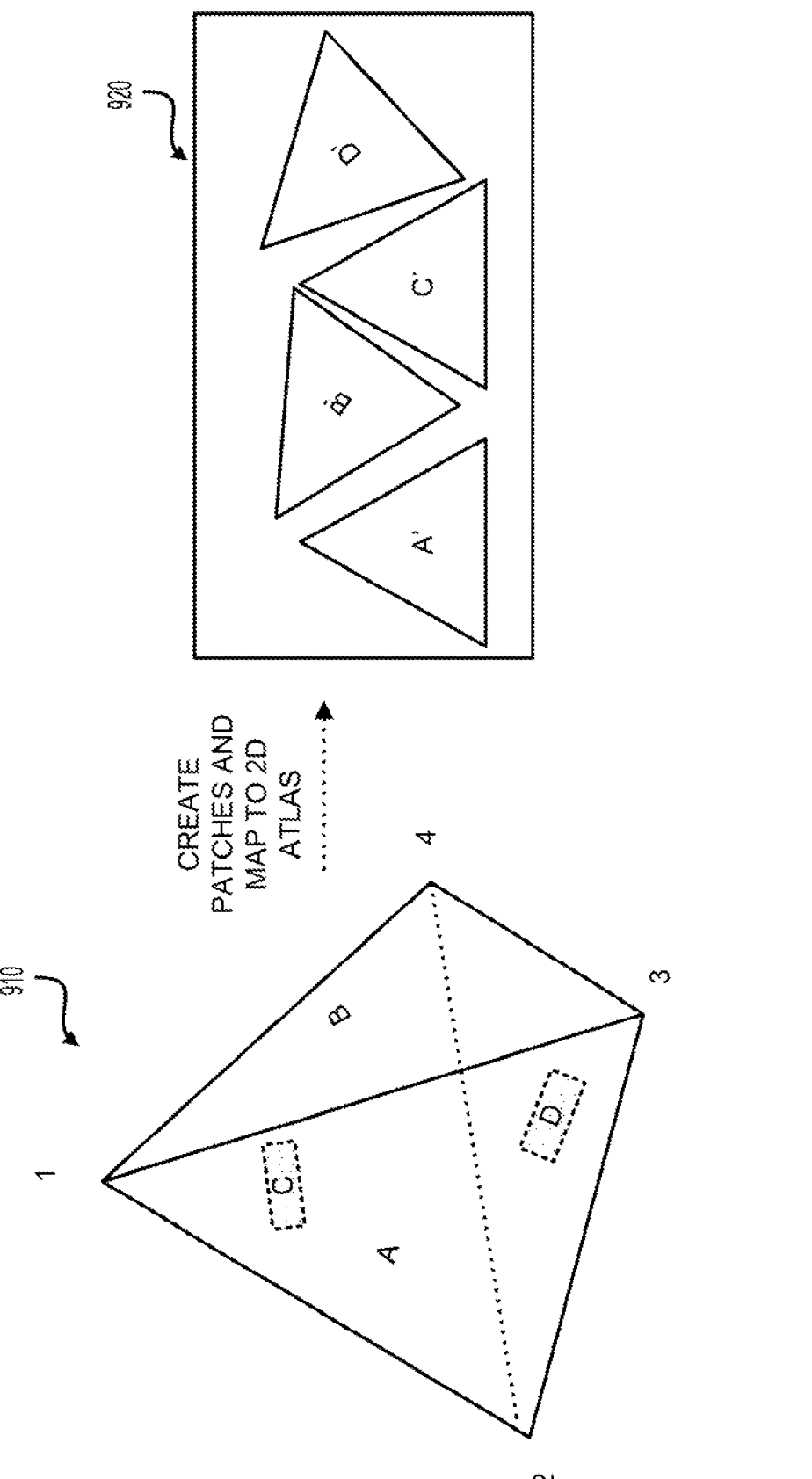
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as map (920). For example, the patch A is mapped to a 2D shape (also referred to as UV patch, or 2D patch) A' in the map (920), the patch B is mapped to a 2D shape (also referred to as UV patch, or 2D patch) B' in the map (920), the patch C is mapped to a 2D shape (also referred to as UV patch, or 2D patch) C' in the map (920), and the patch D is mapped to a 2D shape (also referred to as UV patch, or 2D patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). In some examples, mesh frames in a dynamic mesh can be representations of a surface of an object at different time, and each mesh frame is a representation of the surface of the object at a specific time (also referred to as a time instance). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

In some examples, attribute information and geometry information of a 3D mesh are represented as 2D images, such as attribute maps and geometry maps, and the like. Generally, the 3D mesh is partitioned into patches, and the patches can be parameterized into 2D shapes that are also referred to as UV patches or 2D patches. Generally, a 2D image for the attribute information or geometry information of the 3D mesh includes 2D patches that are packed in the 2D image, and each 2D patch represents the attribute or geometry information of a surface region of the 3D mesh. In some examples, 2D patches are required not to overlap with each other in the 2D image.

Some aspects of the disclosure provide checking techniques for maintaining overlapping-free (not overlapping) property for patch packing. The checking techniques for maintaining overlapping-free property can be used for various mesh processing, such as patch packing in mesh compression, mesh parametrization, atlas packing in volumetric video, object packing in a general setting, and the like. The checking techniques for maintaining overlapping-free property can be categorized into bounding box checking techniques, patches overlapping checking techniques and enlarged patches overlapping checking techniques.

According to an aspect of the disclosure, to check whether or not two 2D patches are overlapping-free, bounding box checking can be employed. A bounding box of a 2D patch is a rectangle with a minimal area that contains the whole 2D patch. When the bounding boxes of two 2D patches are overlapping-free, then the two 2D patches are overlapping-free.

Figure 10B:
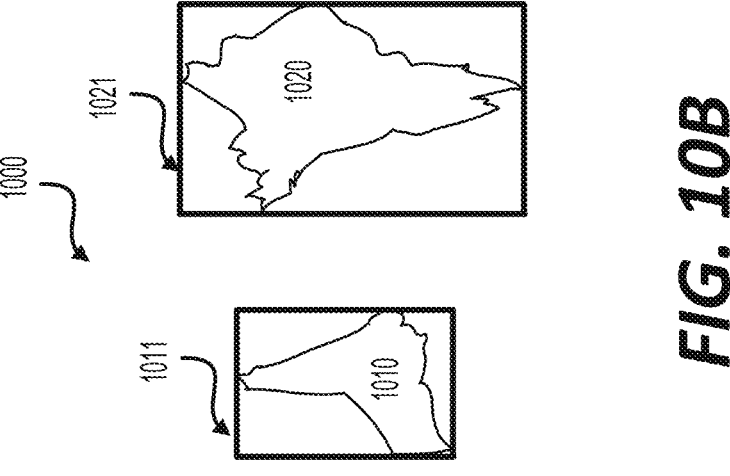
FIGS. 10A-10B shoes an example of using bounding boxes for checking overlapping in some examples.
Figure 10A:
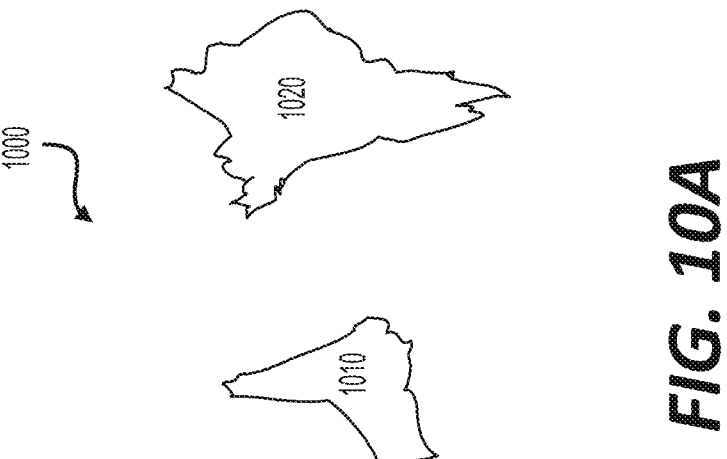

FIGS. 10A-10B shoes an example of using bounding boxes for checking overlapping in some examples. FIG. 10A shows a first 2D patch (1010) and a second 2D patch (1020) in a UV atlas (1000). To check whether the first 2D patch (1010) and the second 2D patch (1020) are overlapping free, bounding boxes of the first 2D patch (1010) and the second 2D patch (1020) are determine.

FIG. 10B shows a first bounding box (1011) for the first 2D patch (1010) and a second bounding box (1021) for the second 2D patch (1020). The first bounding box (1011) is determined based on a minimum U value of all points in the first 2D patch (1010), a maximum U value of all points in the first 2D patch (1010), a minimum V value of all points in the first 2D patch (1010), and a maximum V value of all points in the first 2D patch (1010). The second bounding box (1021) is determined based on a minimum U value of all points in the second 2D patch (1020), a maximum U value of all points in the second 2D patch (1020), a minimum V value of all points in the second 2D patch (1020), and a maximum V value of all points in the second 2D patch (1020).

In some examples, the corner coordinates of the two bounding boxes are used to check whether two bounding boxes are overlapping-free.

In general, the first 2D patch is contained in a first region, and the second 2D patch is contained in a second region. When the first region and the second region are overlapping free, the first 2D patch and the second 2D patch are overlapping free.

The bounding box checking techniques are computation efficient. However, there are cases two overlapping free 2D patches can have overlapped bounding boxes.

According to an aspect of the disclosure, the patches overlapping checking techniques can be used to check overlapping of any 2D patches based on geometry information of the 2D patches themselves, such as UV coordinates of vertices.

In some examples, some patches overlapping checking techniques can do overlapping check based on points of the two 2D patches. For example, two 2D patches are overlapping-free if and only if there is no point that resides inside both 2D patches. When a point is on the boundary of a 2D patch or in the interior of the 2D patch, the point is considered as residing inside the 2D patch.

In some examples, all points with integer pixel coordinates inside a first 2D patch are respectively checked to determine whether the points are inside the second 2D patch. When none of points inside the first 2D patch resides inside the second 2D patch, the first 2D patch and the second 2D patch are overlapping-free. Various polygon algorithms, such as ray casting algorithm, winding number algorithm, and the like can be used to check whether a point resides inside a 2D patch. Some of the polygon algorithms do not check whether a point is on the boundary of a 2D patch. To check whether a point is on the boundary of a 2D patch, the point is checked to determine whether the point is on one of the boundary edges of the 2D patch. A boundary edge of a 2D patch is a line segment of the boundary of the 2D patch.

In some examples, some patches overlapping checking techniques can do overlapping check based on boundaries of the 2D patches. For example, two 2D patches are overlapping-free when the boundaries of two 2D patches do not intersect, and one 2D patch does not reside inside the other 2D patch. Thus, in some examples, two tests are performed, the first test tests that the boundaries of two 2D patches do not intersect, the second test tests that one 2D patch does not reside inside the other 2D patch. When both tests pass, the two 2D patches are overlapping-free.

In some examples, during parameterization, a patch in 3D is parameterized to 2D patch, and 3D vertices of the patch are mapped to 2D vertices according to UV coordinates associated with the 3D vertices, the boundary of the 2D patch includes boundary edges that connects the boundary 2D vertices of the 2D patch. Each boundary edge is a line segment that has a start point and an end point, the starting point and the end point are boundary 2D vertices, the line segments of the boundary edges are connected in an order to form the boundary. For example, a starting point of a current line segment is an end point of a previous line segment in the order, and an end point of the current line segment is a starting point of a next line segment in the order.

In an example, to check whether or not the boundaries of two 2D patches intersect, first boundary edges of the first 2D patch are checked to determine whether any of the first boundary edges intersects an edge of second boundary edges of the second 2D patch. For example, for each first boundary edge in the first boundary edges, the first boundary edge is checked with each second boundary edge of the second boundary edges to determine whether the first boundary edge and the second boundary edge intersects.

To determine whether a first boundary edge and a second boundary edge intersect, an orientation based technique can be used. The first boundary edge is a first line segment with a first start point and a first end point, the second boundary edge is a second line segment with a second start point and the second end point. The orientation based technique includes two checking steps. In the first checking step, a first orientation of a first triangle formed by the first start point, the second start point and the second end point is determined, and a second orientation of a second triangle formed by the first end point, the second start point and the second end point is determined. The first orientation indicates whether the rotation from the first start point to the second start point then the second end point is a clockwise direction or a counterclockwise direction. The second orientation indicates whether the rotation from the first end point to the second start point then the second end point is a clockwise direction or a counterclockwise direction. When the first orientation and the second orientation are different, the boundaries of the two 2D patches intersect.

In some examples, a third orientation of a third triangle formed by the second start point, the first start point and the first end point is determined, and a fourth orientation of a fourth triangle formed by the second end point, the first start point and the first end point is determined. The third orientation indicates whether the rotation from the second start point to the first start point then the first end point is a clockwise direction or a counterclockwise direction. The fourth orientation indicates whether the rotation from the second end point to the first start point then the first end point is a clockwise direction or a counterclockwise direction. When the third orientation and the fourth orientation are different, the boundaries of the two 2D patches intersect.

In some examples, when the first orientation and the second orientation are the same, and the third orientation and the fourth orientation are the same, the second checking step is performed.

In the second checking step, the first start point and the first end point are checked to determine whether the first start point and the first end point are on the second line segment. When both the first start point and the first end point are not on the second line segment, the second start point and the second end point are checked to determine whether the second start point and the second end point are on the first line segment. When both the first start point and the first end point are not on the second line segment, and both the second start point and the second end point are not on the first line segment, the first line segment (e.g., the first boundary edge) and the second line segment (e.g., the second boundary edge) do not intersect.

When none of the first boundary edges of the first 2D patch intersects with any second boundary edges of the second 2D patch, either one of the two 2D patches resides fully inside of the other 2D patch or the two 2D patches are overlapping-free. To check whether one of the 2D patches resides fully inside the other 2D patch, a first point (any point or vertex) of the first 2D patch is checked to determine whether the first point is inside the second 2D patch, and a second point (any point or vertex) of the second 2D patch is checked to determine whether the second point is inside the first 2D patch.

When the boundary edges of the first and second 2D patches are intersection free (do not intersect), and the first point is not inside the second 2D patch and the second point is not in the first 2D patch, the first 2D patch and the second 2D patch are overlapping-free.

According to another aspect of the disclosure, enlarged patches overlapping checking techniques can be used in application scenarios where 2D patches are dilated or enlarged to check whether the enlarged 2D patches are overlapping-free.

A boundary vertex of a 2D patch is defined as a start point (and end point) of a boundary edge, and a boundary pixel is a pixel on a boundary edge, and the boundary pixel is not necessarily a boundary vertex.

In some examples, 2D patch enlargement is performed on all 2D patches in a 2D image. To enlarge a 2D patch by a size N, where N is a positive integer, pixels in a [2N+1, 2N+1] neighborhood of each boundary pixel are included into the 2D patch, the [2N+1, 2N+1] neighborhood is centered at the boundary pixel. For example, when N=1, 2N+1=3, each boundary pixel can have a [3, 3] neighborhood centered at the boundary pixel. Pixels in the [3,3] neighborhood of each boundary pixel are included in the enlarged 2D patch.

Figure 11B:
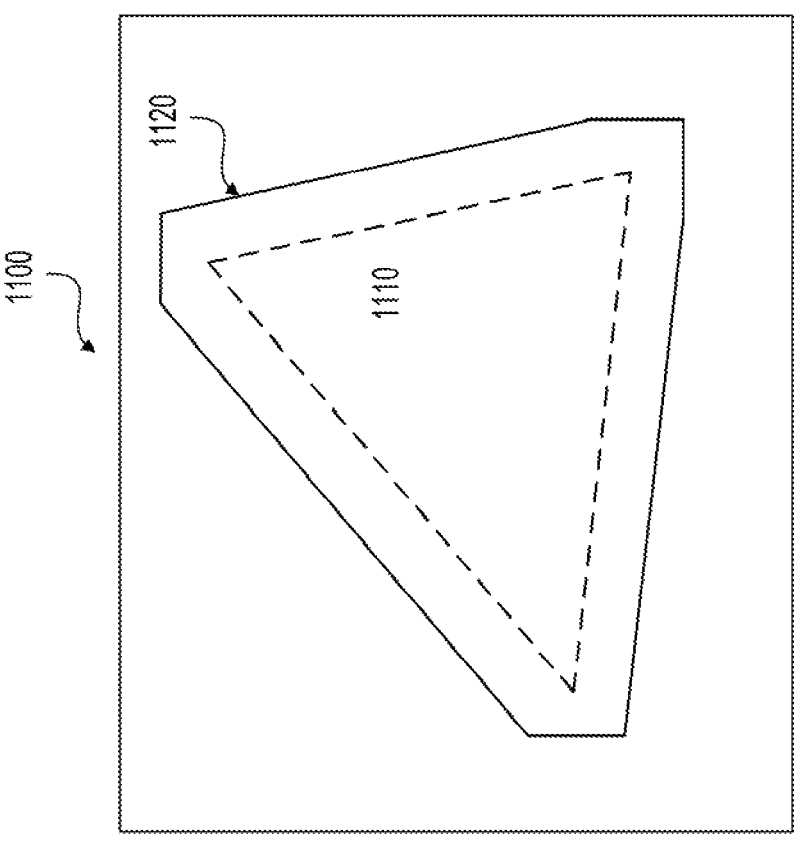
FIGS. 11A and 11B show diagrams of patch enlargement in some examples.
Figure 11A:
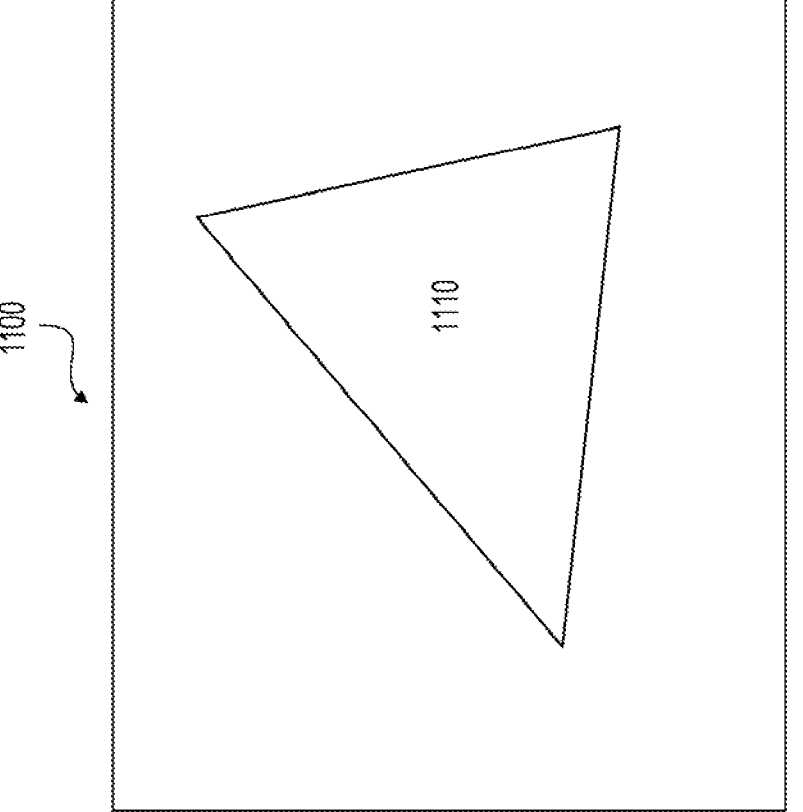

FIG. 11A shows a diagram of a 2D patch (1110) in a 2D map (1100), and FIG. 11B shows a diagram of an enlarged 2D patch (1120) in the 2D map (1100) in an example. In the FIG. 11A example, the 2D patch (1110) has a triangle shape. In FIG. 11B, the boundary of the enlarged 2D patch (1120) is shown as a solid curve, and the boundary of the original 2D patch (1110) inside the enlarged 2D patch (1120) is shown by a dotted curve.

In an example, to check whether two enlarged 2D patches are overlapping-free, the new boundary vertices of the enlarged 2D patches are determined. Then, the new boundary edges of the enlarged 2D patches can be determined, and the patches overlapping checking techniques can be used on the enlarged 2D patches.

In an example, the bounding box checking techniques can be used. Due to the enlargement, a first enlarged bounding box for the first enlarged 2D patch is enlarged from the first bounding box of the first 2D patch by N to the left, right, top, and bottom, respectively; and a second enlarged bounding box for the second enlarged 2D patch is enlarged from the second bounding box of the second 2D patch by N to the left, right, top, and bottom, respectively. Then, the bounding box checking techniques can be applied on the first enlarged bounding box and the second enlarged bounding box. When the first enlarged bounding box and the second enlarged bounding box are overlapping free, the first enlarged 2D patch and the second enlarged 2D patch are overlapping free.

In another example, checking overlapping-free of two enlarged 2D patches can be performed based on points of the two enlarged 2D patches. For example, two enlarged 2D patches are overlapping-free if and only if there is no point that resides inside both enlarged 2D patches.

In some examples, all points with integer pixel coordinates inside a first enlarged 2D patch are respectively checked to determine whether the points are inside the second enlarged 2D patch. When none of points inside the first enlarged 2D patch resides inside the second enlarged 2D patch, the first enlarged 2D patch and the second enlarged 2D patch are overlapping-free.

It is noted that a boundary pixel is a pixel on a boundary of a 2D patch, and is not necessarily a boundary vertex. A boundary vertex is a start point (or end point) of a boundary edge of the 2D patch.

An aspect of the disclosure provides enlarged patches overlapping checking techniques based on line segments processing. In some examples, additional line segments can be added into an original set of the boundary edges of a 2D patch to form a new set of boundary edges for the 2D patch. For example, additional line segments are added to a first original set of boundary edges of a first 2D patch to form a first new set of boundary edges for the first 2D patch, and additional line segments are added to a second original set of boundary edges of a second 2D patch to form a second new set of boundary edges for the second 2D patch. To check whether two enlarged 2D patches of the first 2D patch and the second 2D patch are overlapping-free can be performed by checking whether line segments from the first new set of boundary edges intersect line segments from the second new set of boundary edges.

Figure 12:
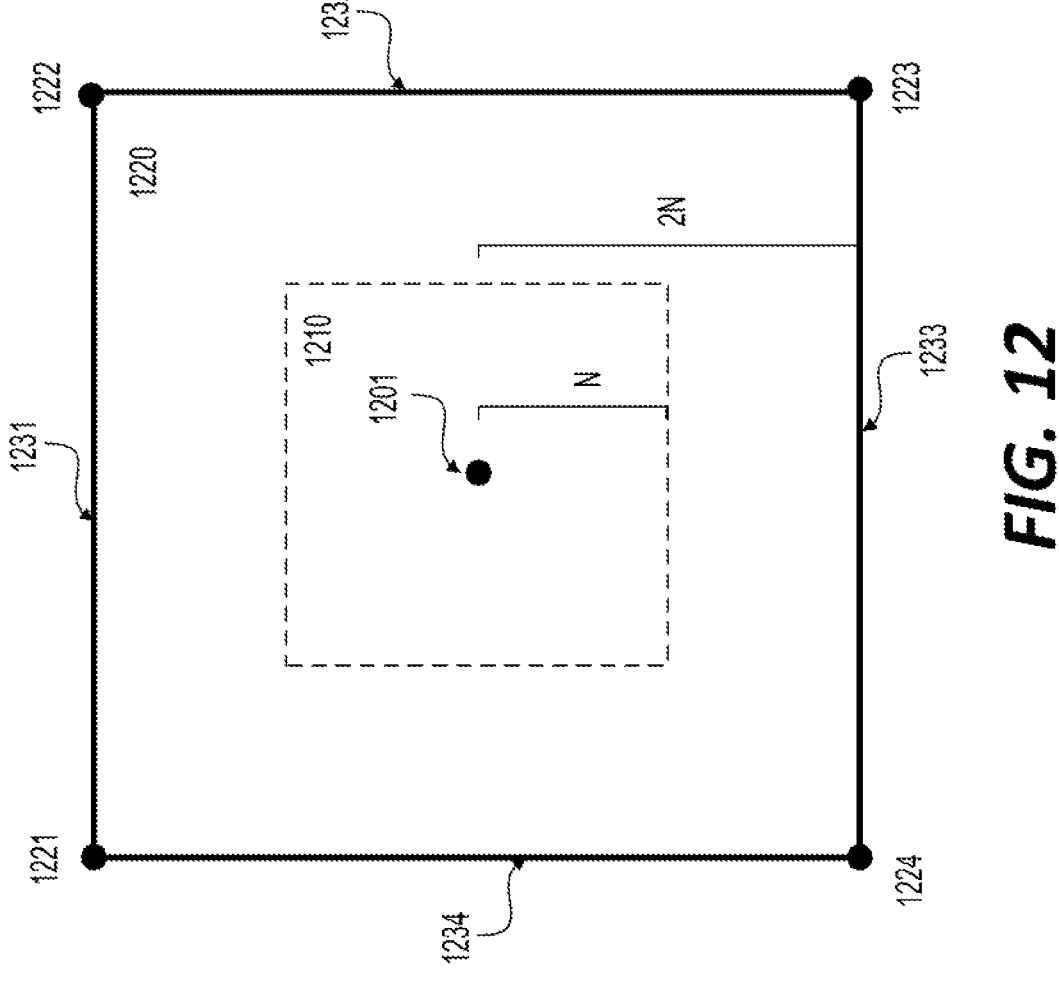
FIG. 12 shows a diagram illustrating new line segments in response to patch enlargement in an example.

In some examples, the additional line segments are double neighborhood boundaries of 2D boundary vertices of the 2D patch, such as shown by FIG. 12.

FIG. 12 shows a diagram illustrating new line segments for a boundary vertex of an 2D patch in an example. FIG. 12 shows a boundary vertex (1201) for a 2D patch (not shown). In an example, patch enlargement of size N (N is a positive integer) is performed to generate an enlarged 2D patch (not shown). FIG. 12 also shows a first neighborhood (1210) of a size [2N+1, 2N+1] centered at the boundary vertex (1201), and a second neighborhood (1220) of a size [4N+1, 4N+1] centered at the boundary vertex (1201). The first neighborhood (1210) of the boundary vertex (1201) includes pixels that are included in the enlarged 2D patch. The second neighborhood (1220) is referred to as double neighborhood (1220) of the boundary vertex (1201). The double neighborhood (1220) has a square shape and includes four vertices (1221)-(1224).

In an example, the boundary vertex (1201) has UV coordinates (u,v), then the vertex (1221) has UV coordinates (u−2N, v+2N), the vertex 1224 has UV coordinates (u−2N, v−2N), the vertex (1223) has UV coordinates (u+2N, v−2N), and the vertex (1222) has UV coordinates (u+2N, v+2N), respectively.

In the FIG. 12 example, four line segments (1231)-(1234) of the boundary of the double neighborhood (1220) are the additional line segments to add into the new set of edges in response to the boundary vertex (1201). The line segment (1231) connects the vertices (1221) and (1222); the line segment (1232) connects the vertices (1222) and (1223); the line segment (1233) connects the vertices (1223) and (1224); and the line segment (1234) connects the vertex (1224) and (1221).

In some examples, in response to patch enlargement, a first new set of boundary edges of a first 2D patch is updated from a first original set of boundary edges of the first 2D patch with additional line segments based on double enlarged neighborhood of boundary vertices of the first 2D patch, and a second new set of boundary edges of a second 2D patch is updated from a second original set of boundary edges of the second 2D patch with additional line segments based on double enlarged neighborhood of boundary vertices of the second 2D patch. Then, in some examples, two tests are performed, the first test can test that the first new set of boundary edges (including original boundary edges and additional line segments based on double enlarged neighborhood of boundary vertices of the first 2D patch) and the second new set of boundary edges (including original boundary edges and additional line segments based on double enlarged neighborhood of boundary vertices of the second 2D patch) do not intersect, the second test can test that one enlarged 2D patch does not reside inside the other enlarged 2D patch. When both tests pass, the two enlarged 2D patches are overlapping-free.

Figure 13B:
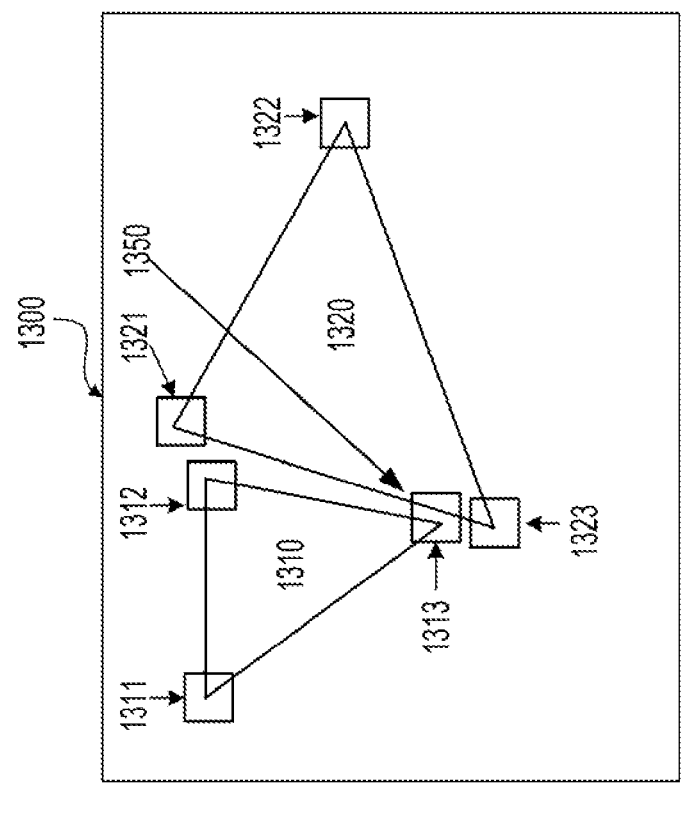
FIGS. 13A-13B show diagrams of two non-overlapped 2D patches that overlap after patch enlargement in some examples.
Figure 13A:
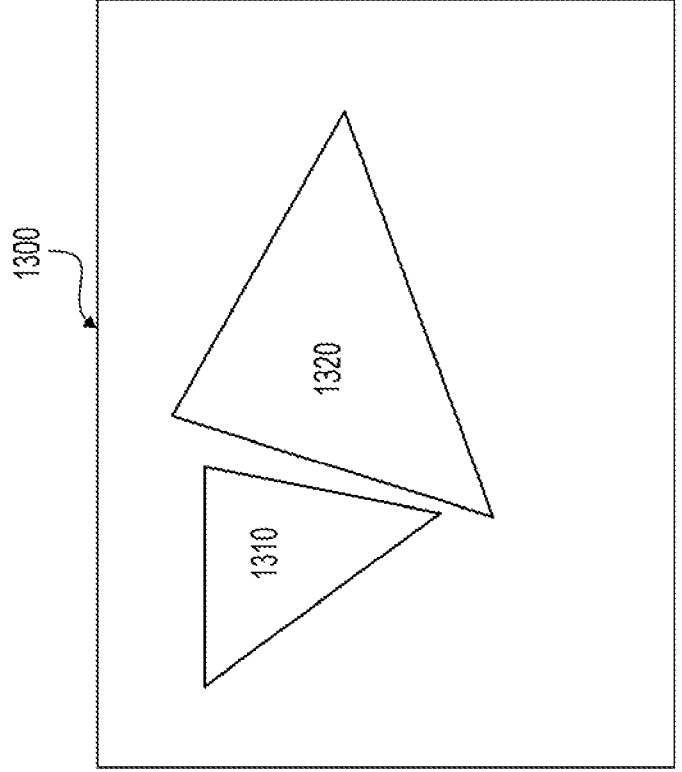

FIGS. 13A-13B shows diagrams of two non-overlapped 2D patches that overlap after patch enlargement in some examples. FIG. 13A shows a first 2D patch (1310) and a second 2D patch (1320) in a 2D map (1300). The first 2D patch (1310) and the second 2D patch (1320) are two non-overlapped 2D patches.

FIG. 13B shows the first 2D patch (1310) and the second 2D patch (1320) in the 2D map (1300), and the double enlarged neighborhood of boundary vertices of the first 2D patch (1310) and the double enlarged neighborhood of boundary vertices of the second 2D patch (1320). For example, the double enlarged neighborhood of boundary vertices of the first 2D patch (1310) includes three squares (1311)-(1313), and the double enlarged neighborhood of boundary vertices of the second 2D patch (1320) includes three squares (1321)-(1323). The overlapping of the enlarged 2D patches can be determined as the boundary of the double enlarged neighborhood (1313) intersects with the original boundary edge of the second 2D patch (1320), as shown by 1350.

FIG. 14 shows a flow chart outlining a process (1400) according to an embodiment of the disclosure. The process (1400) can be used during mesh processing. In various embodiments, the process (1400) is executed by processing circuitry. In some embodiments, the process (1400) is implemented in software instructions, thus when the processing circuitry executes the software instructions, the processing circuitry performs the process (1400). The process starts at (S1401) and proceeds to (S1410).

At (S1410), first UV coordinates associated with first vertices of a first patch and second UV coordinates associated with second vertices of a second patch are received. The first patch and the second patch are partitions from a 3D mesh, the 3D mesh represents a surface of an object with polygons and is partitioned into patches. The first patch includes the first vertices that are mapped to first 2D vertices of a first 2D patch in a 2D map according to the first UV coordinates. The second patch includes the second vertices that are mapped to second 2D vertices of a second 2D patch in the 2D map according to the second UV coordinates.

At (S1420), a first region that encompasses the first 2D patch in the 2D map is determined.

At (S1430), a second region that encompasses the second 2D patch in the 2D map is determined.

At (S1440), the first 2D patch and the second 2D patch are determined to be overlapping free in response to the first region and the second region being overlapping free.

In some embodiments, the first region is a first bounding box of the first 2D patch, and the second region is a second bounding box of the second 2D patch. In some examples, the first bounding box is determined according to a minimum U coordinate value, a maximum U coordinate value, a minimum V coordinate value and a maximum V coordinate value in the first UV coordinates, and the second bounding box is determined according to a minimum U coordinate value, a maximum U coordinate value, a minimum V coordinate value and a maximum V coordinate value in the second UV coordinates.

In some embodiments, the first region is an enlarged first bounding box of an enlarged first 2D patch for the first 2D patch, and the second region is an enlarged second bounding box of an enlarged second 2D patch for the second 2D patch. In some examples, a first bounding box is determined according to a minimum U coordinate value, a maximum U coordinate value, a minimum V coordinate value and a maximum V coordinate value in the first UV coordinates; and a second bounding box is determined according to a minimum U coordinate value, a maximum U coordinate value, a minimum V coordinate value and a maximum V coordinate value in the second UV coordinates. The enlarged first bounding box is determined by enlarging a boundary of the first bounding box, and the enlarged second bounding box is determined by enlarging a boundary of the second bounding box.

Then, the process proceeds to (S1499) and terminates.

The process (1400) can be suitably adapted. Step(s) in the process (1400) can be modified and/or omitted. Additional step(s) can be added. Any suitable order of implementation can be used.

FIG. 15 shows a flow chart outlining a process (1500) according to an embodiment of the disclosure. The process (1500) can be used during a mesh processing. In various embodiments, the process (1500) is executed by processing circuitry. In some embodiments, the process (1500) is implemented in software instructions, thus when the processing circuitry executes the software instructions, the processing circuitry performs the process (1500). The process starts at (S1501) and proceeds to (S1510).

At (S1510), first UV coordinates associated with first vertices of a first patch and second UV coordinates associated with second vertices of a second patch are received. The first patch and the second patch are partitions from a 3D mesh, the 3D mesh represents a surface of an object with polygons and is partitioned into patches. The first patch includes the first vertices that are mapped to first 2D vertices of a first 2D patch in a 2D map according to the first UV coordinates. The second patch includes the second vertices that are mapped to second 2D vertices of a second 2D patch in the 2D map according to the second UV coordinates.

At (S1520), the first 2D patch and the second 2D patch are determined to be overlapping free in response to a nonexistence of a point residing in both the first 2D patch and the second 2D patch.

In some embodiments, whether respective first points at integer pixel positions in the first 2D patch reside in the second 2D patch are checked. Further, whether the respective first points in the first 2D patch are on a boundary of the second 2D patch are checked. In an example, when none of the first points at integer pixel positions in the first 2D patch reside in the second 2D patch, and none of the first points in the first 2D patch are on the boundary of the second 2D patch, the first 2D patch and the second 2D patch are overlapping free.

In some embodiments, whether respective first boundary vertices in the first 2D vertices reside in the second 2D patch are checked and whether respective second boundary vertices in the second 2D vertices reside in the first 2D patch are checked. In an example, when none of the first boundary vertices in the first 2D vertices reside in the second 2D patch and none of the second boundary vertices in the second 2D vertices reside in the first 2D patch, the first 2D patch and the second 2D patch are overlapping free. In some examples, whether the respective first boundary vertices in the first 2D vertices are on a boundary of the second 2D patch is checked; and whether the respective second boundary vertices in the second 2D vertices are on a boundary of the first 2D patch is checked.

In some embodiments, a first boundary of the first 2D patch and a second boundary of the second 2D patch are determined to be intersection free (e.g., do not intersect). Further, none of the first 2D patch and the second 2D patch resides inside another of the first 2D patch and the second 2D patch. Then, the first 2D patch and the second 2D patch are overlapping free.

To determine that the first boundary and the second boundary are intersection free, in some examples, for a first line segment in the first boundary and a second line segment in the second boundary, a first orientation of a first triangle formed by a first start point of the first line segment, a second start point of the second line segment, and a second end of the second line segment is determined, and a second orientation of a second triangle formed by a first end point of the first line segment, the second start point of the second line segment, and the second end of the second line segment is determined. The first boundary and the second boundary intersect in response to the first orientation being different from the second orientation.

In some examples, in response to at least one of the first start point and the first end point being on the second line segment, the first line segment and the second line segment intersect. Similarly, in response to at least one of the second start point and the second end point being on the first line segment, the first line segment and the second line segment intersect.

In some examples, the first line segment and the second line segment can switch role. For example, a third orientation of a third triangle formed by the second start point of the second line segment, the first start point of the first line segment, and the first end of the first line segment is determined, and a fourth orientation of a fourth triangle formed by the second end point of the second line segment, the first start point of the first line segment, and the first end of the first line segment is determined. The first boundary and the second boundary intersect in response to the third orientation being different from the fourth orientation.

In some examples, to determine that none of the first 2D patch and the second 2D patch resides inside the other of the first 2D patch and the second 2D patch, a first point of the first 2D patch is determined not to reside inside of the second 2D patch, and a second point of the second 2D patch is determined not to reside inside the first 2D patch.

It is noted that in some examples, the first 2D patch is a first enlarged 2D patch of a third 2D patch, the second 2D patch is a second enlarged 2D patch of a fourth 2D patch. Then, the process proceeds to (S1599) and terminates.

The process (1500) can be suitably adapted. Step(s) in the process (1500) can be modified and/or omitted. Additional step(s) can be added. Any suitable order of implementation can be used.

FIG. 16 shows a flow chart outlining a process (1600) according to an embodiment of the disclosure. The process (1600) can be used during a mesh processing. In various embodiments, the process (1600) is executed by processing circuitry. In some embodiments, the process (1600) is implemented in software instructions, thus when the processing circuitry executes the software instructions, the processing circuitry performs the process (1600). The process starts at (S1601) and proceeds to (S1610).

At (S1610), first UV coordinates associated with first vertices of a first patch and second UV coordinates associated with second vertices of a second patch are received. The first patch and the second patch are partitions from a 3D mesh, the 3D mesh represents a surface of an object with polygons and is partitioned into patches. The first patch includes the first vertices that are mapped to first 2D vertices of a first 2D patch in a 2D map according to the first UV coordinates. The second patch includes the second vertices that are mapped to second 2D vertices of a second 2D patch in the 2D map according to the second UV coordinates.

At (S1620), an enlarged first 2D patch is determined by applying a first enlargement of a first size (e.g., size of N, N is a positive integer) on first boundary pixels of a first boundary of the first 2D patch. The first enlargement on a first boundary pixel causes pixels in a neighborhood square centered at the first boundary pixel to be included in the enlarged first 2D patch. The side of neighborhood square has a size of 2N+1.

At (S1630), an enlarged second 2D patch is determined by applying a second enlargement of the first size on second boundary pixels of a second boundary of the second 2D patch.

At (S1640), whether the enlarged first 2D patch and the enlarged second 2D patch are overlapping free is checked.

In some embodiments, to check that the enlarged first 2D patch and the enlarged second 2D patch are overlapping free, first double enlarged squares are determined by applying a third enlargement of a second size on first boundary vertices in the first 2D vertices, the second size doubles the first size. A first double enlarged square on a first boundary vertex is centered at the first boundary vertex, and the side of the first double enlarged square has a size of 4N+1. Then, second double enlarged squares are determined by applying a fourth enlargement of the second size on second boundary vertices in the second 2D vertices. A first set of line segments is determined to include first boundary edges in the first boundary, and first neighborhood boundary edges of the first double enlarged squares. A second set of line segments is determined to include second boundary edges of the second boundary, and second neighborhood boundary edges of the second double enlarged squares. Then, the first set of line segments and the second set of line segments are checked whether the first set of line segments and the second set of line segments are intersection free. In an example, when the first set of line segments and the second set of line segments are intersection free, the enlarged first 2D patch and the enlarged second 2D patch are overlapping free.

In some examples, the enlarged first 2D patch is determined not to reside in the enlarged second 2D patch, and the enlarged second 2D patch is determined not to reside in the enlarged first 2D patch.

To check that the enlarged first 2D patch and the enlarged second 2D patch are overlapping free, in an example, a first bounding box of the enlarged first 2D patch and a second bounding box of the enlarged second 2D patch are checked to determine whether the first bounding box and the second bounding box are overlapping free. When the first bounding box and the second bounding box are overlapping free, the enlarged first 2D patch and the enlarged second 2D patch are overlapping free. In another example, the enlarged first 2D patch and the enlarged second 2D patch are determined to be overlapping free in response to a nonexistence of a point residing in both the enlarged first 2D patch and the enlarged second 2D patch.

Then, the process proceeds to (S1699) and terminates.

The process (1600) can be suitably adapted. Step(s) in the process (1600) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits).

In some examples, the one or more processors execute a program that is stored in a non-transitory computer-readable medium.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
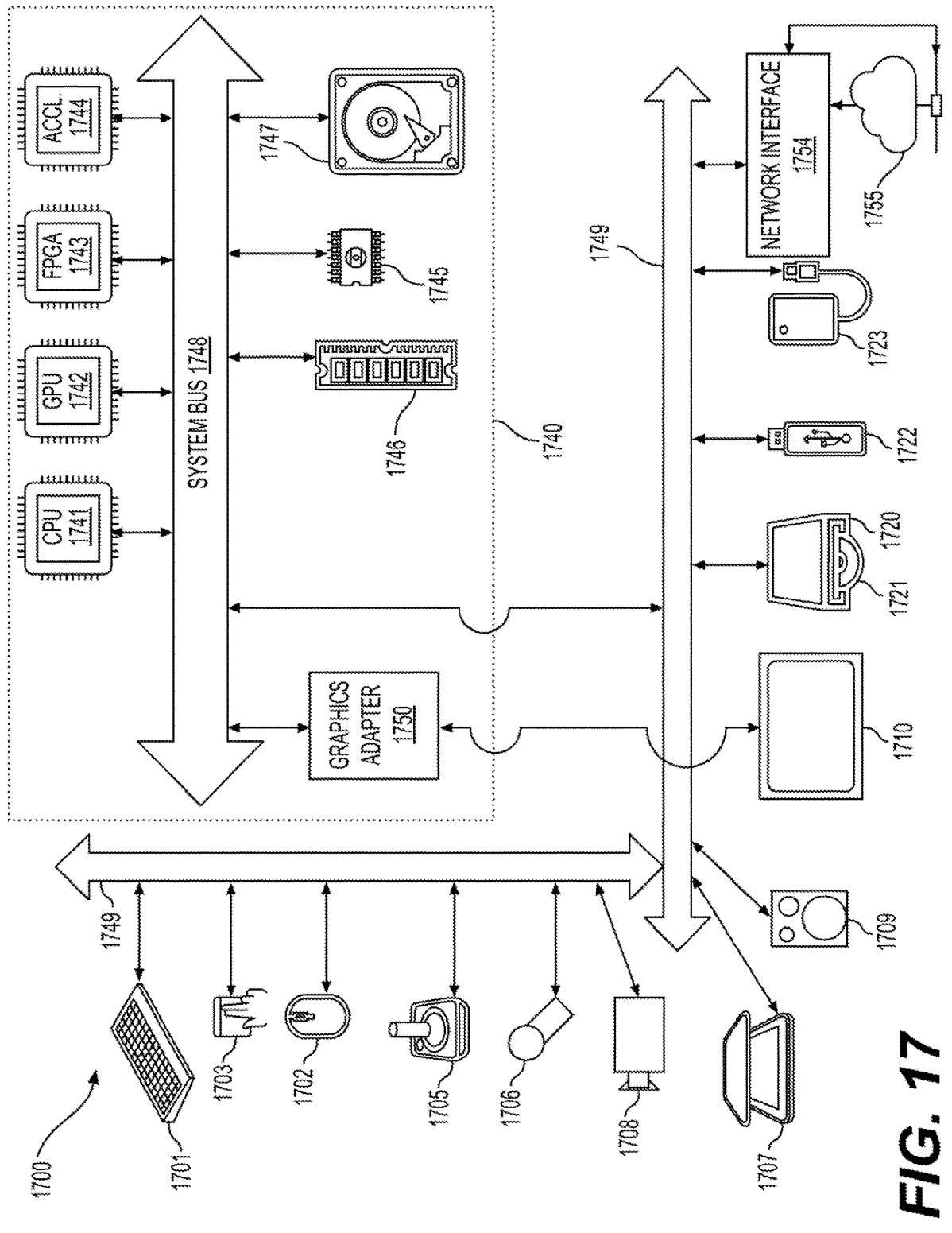
FIG. 17 is a schematic illustration of a computer system in some examples.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapters (1750), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, the screen (1710) can be connected to the graphics adapter (1750). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh processing, comprising:

receiving, first UV coordinates associated with first vertices of a first patch and second UV coordinates associated with second vertices of a second patch, the first patch and the second patch being partitions from a three dimensional (3D) mesh, the 3D mesh representing a surface of an object with polygons and being partitioned into patches, the first patch comprising the first vertices that are mapped to first two dimensional (2D) vertices of a first 2D patch in a 2D map according to the first UV coordinates, the second patch comprising the second vertices that are mapped to second 2D vertices of a second 2D patch in the 2D map according to the second UV coordinates;

determining a first region that encompasses the first 2D patch in the 2D map, the first region being larger than the first 2D patch;

determining a second region that encompasses the second 2D patch in the 2D map, the second region being larger than the second 2D patch;

determining whether the first region and the second region are overlapping free based on first corner coordinates of the first region and second corner coordinates of the second region; and determining whether the first 2D patch and the second 2D patch are overlapping free based on the first region and the second region, wherein:

when the first 2D patch is an enlarged first 2D patch from a first initial 2D patch and the second 2D patch is an enlarged second 2D patch from a second initial 2D patch, the first 2D patch and the second 2D patch are determined to be overlapped when a square region corresponding to a corner pixel of the first initial 2D patch intersects a boundary edge of the second initial 2D patch.

2. The method of claim 1, wherein the first region is an enlarged first bounding box of the enlarged first 2D patch for the first 2D patch, and the second region is an enlarged second bounding box of the enlarged second 2D patch for the second 2D patch.

3. The method of claim 2, further comprising:

determining a first bounding box of the first 2D patch according to a minimum U coordinate value, a maximum U coordinate value, a minimum V coordinate value and a maximum V coordinate value in the first UV coordinates;

determining a second bounding box of the second 2D patch according to a minimum U coordinate value, a maximum U coordinate value, a minimum V coordinate value and a maximum V coordinate value in the second UV coordinates;

determining the enlarged first bounding box by enlarging a boundary of the first bounding box; and determining the enlarged second bounding box by enlarging a boundary of the second bounding box.

4. An apparatus for mesh processing, comprising processing circuitry configured to:

receive, first UV coordinates associated with first vertices of a first patch and second UV coordinates associated with second vertices of a second patch, the first patch and the second patch being partitions from a three dimensional (3D) mesh, the 3D mesh representing a surface of an object with polygons and being partitioned into patches, the first patch comprising the first vertices that are mapped to first two dimensional (2D) vertices of a first 2D patch in a 2D map according to the first UV coordinates, the second patch comprising the second vertices that are mapped to second 2D vertices of a second 2D patch in the 2D map according to the second UV coordinates;

determine a first region that encompasses the first 2D patch in the 2D map, the first region being larger than the first 2D patch;

determine a second region that encompasses the second 2D patch in the 2D map, the second region being larger than the second 2D patch;

determine whether the first region and the second region are overlapping free based on first corner coordinates of the first region and second corner coordinates of the second region; and determine whether the first 2D patch and the second 2D patch are overlapping free based on the first region and the second region, wherein:

when the first 2D patch is an enlarged first 2D patch from a first initial 2D patch and the second 2D patch is an enlarged second 2D patch from a second initial 2D patch, the first 2D patch and the second 2D patch are determined to be overlapped when a square region corresponding to a corner pixel of the first initial 2D patch intersects a boundary edge of the second initial 2D patch.

5. The apparatus of claim 4, wherein the first region is an enlarged first bounding box of the enlarged first 2D patch for the first 2D patch, and the second region is an enlarged second bounding box of the enlarged second 2D patch for the second 2D patch.

6. The apparatus of claim 5, wherein the processing circuitry is configured to:

determine a first bounding box of the first 2D patch according to a minimum U coordinate value, a maximum U coordinate value, a minimum V coordinate value and a maximum V coordinate value in the first UV coordinates;

determine a second bounding box of the second 2D patch according to a minimum U coordinate value, a maximum U coordinate value, a minimum V coordinate value and a maximum V coordinate value in the second UV coordinates;

determine the enlarged first bounding box by enlarging a boundary of the first bounding box; and determine the enlarged second bounding box by enlarging a boundary of the second bounding box.

7. A non-transitory computer-readable storage medium storing instructions which when executed by at least one processor cause the at least one processor to perform:

receiving, first UV coordinates associated with first vertices of a first patch and second UV coordinates associated with second vertices of a second patch, the first patch and the second patch being partitions from a three dimensional (3D) mesh, the 3D mesh representing a surface of an object with polygons and being partitioned into patches, the first patch comprising the first vertices that are mapped to first two dimensional (2D) vertices of a first 2D patch in a 2D map according to the first UV coordinates, the second patch comprising the second vertices that are mapped to second 2D vertices of a second 2D patch in the 2D map according to the second UV coordinates;

determining a first region that encompasses the first 2D patch in the 2D map, the first region being larger than the first 2D patch;

determining a second region that encompasses the second 2D patch in the 2D map, the second region being larger than the second 2D patch;

determining whether the first region and the second region are overlapping free based on first corner coordinates of the first region and second corner coordinates of the second region; and determining whether the first 2D patch and the second 2D patch are overlapping free based on the first region and the second region, wherein:

when the first 2D patch is an enlarged first 2D patch from a first initial 2D patch and the second 2D patch is an enlarged second 2D patch from a second initial 2D patch, the first 2D patch and the second 2D patch are determined to be overlapped when a square region corresponding to a corner pixel of the first initial 2D patch intersects a boundary edge of the second initial 2D patch.

8. The non-transitory computer-readable storage medium of claim 7, wherein the first region is an enlarged first bounding box of the enlarged first 2D patch for the first 2D patch, and the second region is an enlarged second bounding box of the enlarged second 2D patch for the second 2D patch.

9. The non-transitory computer-readable storage medium of claim 8, wherein the instructions cause the at least one processor to perform:

determining a first bounding box of the first 2D patch according to a minimum U coordinate value, a maximum U coordinate value, a minimum V coordinate value and a maximum V coordinate value in the first UV coordinates;

determining a second bounding box of the second 2D patch according to a minimum U coordinate value, a maximum U coordinate value, a minimum V coordinate value and a maximum V coordinate value in the second UV coordinates;

determining the enlarged first bounding box by enlarging a boundary of the first bounding box; and determining the enlarged second bounding box by enlarging a boundary of the second bounding box.

* * * * *